(12) United States Patent
Bennett et al.

(10) Patent No.: US 7,761,295 B2
(45) Date of Patent: *Jul. 20, 2010

(54) COMPUTER-AIDED TRANSCRIPTION SYSTEM USING PRONOUNCEABLE SUBSTITUTE TEXT WITH A COMMON CROSS-REFERENCE LIBRARY

(75) Inventors: James D. Bennett, Chicago, IL (US); Lawrence M. Jarvis, Wheaton, IL (US)

(73) Assignee: Engate LLC, New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/559,236

(22) Filed: Nov. 13, 2006

(65) Prior Publication Data

US 2007/0265846 A1 Nov. 15, 2007

Related U.S. Application Data

(63) Continuation of application No. 09/837,752, filed on Apr. 17, 2001, which is a continuation of application No. 09/330,516, filed on Jun. 11, 1999, now abandoned, which is a continuation of application No. 09/144,582, filed on Aug. 31, 1998, now Pat. No. 5,926,787, which is a continuation of application No. 08/065,163, filed on May 20, 1993, now Pat. No. 5,815,639, which is a continuation-in-part of application No. 08/036,488, filed on Mar. 24, 1993, now Pat. No. 5,369,704.

(51) Int. Cl.
*G10L 15/26* (2006.01)
(52) U.S. Cl. .............................. 704/235; 704/257; 704/9; 704/2; 704/277
(58) Field of Classification Search ................. 704/235, 704/257, 3, 2, 9, 277
See application file for complete search history.

(56) References Cited

U.S. PATENT DOCUMENTS 3,557,927 A 1/1971 Wright et al.

(Continued)

FOREIGN PATENT DOCUMENTS

JP 402007159 1/1990

(Continued)

OTHER PUBLICATIONS

*Case CATalyst User's Guide*, Stenograph LLC,(2000),p. 1-7, 119-120, 209-323, 283-284 (35 pgs.).

(Continued)

*Primary Examiner*—Vijay B Chawan
(74) *Attorney, Agent, or Firm*—Pillsbury Winthrop Shaw Pittman LLP

(57) ABSTRACT

A transcription network having linked computer terminals for a court reporter and for examining, defending, and associate attorneys is disclosed. Cross-reference libraries, phoneme libraries, phoneme dictionaries, and pronunciation indices are used by a reporter terminal to generate readable text transcripts which are communicated to the other terminals for real-time review. Cross-reference libraries provide for the bulk of the transcription while stenographic keystrokes that cannot be directly transcribed are converted to phoneme text or other pronounceable form for down-line readability. A common cross-reference library is provided to supplement local cross-reference libraries to aid transcription and to provide for standardization. The reporter terminal provides for update and preparation of the local cross-reference libraries using case law and evidence prior to a proceeding, as well as provides key-stroke training for the court reporter. Foreign language tables are also provided to service proceedings involving two or more languages.

14 Claims, 10 Drawing Sheets

FOREIGN LANGUAGE TABLE

| identified_CT_string | corresponding_translation |
|---|---|
| "beach" | "playa" |
| "good" | "bueno" |
| "you" | "usted" |
| ⋮ | ⋮ |

U.S. PATENT DOCUMENTS

| | | | |
|---|---|---|---|
| 3,597,538 A | 8/1971 | Binenboum | |
| 3,798,387 A | 3/1974 | Gallagher, Jr. | |
| 3,879,751 A | 4/1975 | Gimelli | |
| 3,892,915 A | 7/1975 | Budworth et al. | |
| 4,041,467 A | 8/1977 | Cota et al. | |
| 4,205,351 A | 5/1980 | Michals | |
| 4,249,041 A | 2/1981 | Smith et al. | |
| 4,435,617 A | 3/1984 | Griggs | |
| 4,566,065 A | 1/1986 | Toth | |
| 4,633,430 A | 12/1986 | Cooper | |
| 4,641,203 A | 2/1987 | Miller | |
| 4,685,060 A | 8/1987 | Yamano et al. | |
| 4,692,042 A | 9/1987 | Cuff et al. | |
| 4,706,212 A * | 11/1987 | Toma | 704/2 |
| 4,724,285 A * | 2/1988 | Lefler et al. | 178/21 |
| 4,725,694 A | 2/1988 | Auer et al. | |
| 4,765,764 A | 8/1988 | Lefler | |
| 4,800,510 A | 1/1989 | Vinberg et al. | |
| 4,817,127 A | 3/1989 | Chamberlin et al. | |
| 4,858,170 A | 8/1989 | DeWick et al. | |
| 4,864,501 A | 9/1989 | Kucera et al. | |
| 4,866,778 A | 9/1989 | Baker et al. | |
| 4,908,866 A | 3/1990 | Goldwasser et al. | |
| 4,908,873 A | 3/1990 | Philibert et al. | |
| 4,924,387 A * | 5/1990 | Jeppesen | 705/8 |
| RE33,337 E | 9/1990 | Lefler et al. | |
| 4,965,763 A | 10/1990 | Zamora | |
| 4,965,819 A | 10/1990 | Kannes | |
| 4,972,349 A | 11/1990 | Kleinberger | |
| 4,985,929 A | 1/1991 | Tsuyama | |
| 5,031,113 A | 7/1991 | Hollerbauer | |
| 5,043,891 A | 8/1991 | Goldstein et al. | |
| 5,051,924 A | 9/1991 | Bergeron et al. | |
| 5,101,402 A | 3/1992 | Chiu et al. | |
| 5,127,003 A | 6/1992 | Doll, Jr. et al. | |
| 5,146,439 A | 9/1992 | Jachmann et al. | |
| 5,148,366 A | 9/1992 | Buchanan et al. | |
| 5,157,783 A | 10/1992 | Anderson et al. | |
| 5,164,985 A | 11/1992 | Nysen et al. | |
| 5,172,281 A | 12/1992 | Ardis et al. | |
| 5,239,462 A | 8/1993 | Jones et al. | |
| 5,247,575 A | 9/1993 | Sprague et al. | |
| 5,265,065 A | 11/1993 | Turtle | |
| 5,267,155 A | 11/1993 | Buchanan et al. | |
| 5,272,571 A | 12/1993 | Henderson et al. | |
| 5,278,980 A | 1/1994 | Pedersen et al. | |
| 5,280,430 A | 1/1994 | Woods et al. | |
| 5,293,616 A | 3/1994 | Flint | |
| 5,303,361 A | 4/1994 | Colwell et al. | |
| 5,309,359 A | 5/1994 | Katz et al. | |
| 5,329,608 A | 7/1994 | Bocchieri et al. | |
| 5,329,609 A | 7/1994 | Sanada et al. | |
| 5,369,704 A * | 11/1994 | Bennett et al. | 715/530 |
| 5,369,763 A | 11/1994 | Biles | |
| 5,375,235 A | 12/1994 | Berry et al. | |
| 5,384,701 A | 1/1995 | Stentiford et al. | |
| 5,392,428 A | 2/1995 | Robins | |
| 5,414,754 A | 5/1995 | Pugh et al. | |
| 5,444,615 A | 8/1995 | Bennett et al. | |
| 5,463,547 A | 10/1995 | Markowitz et al. | |
| 5,477,451 A | 12/1995 | Brown et al. | |
| 5,519,808 A | 5/1996 | Benton, Jr. et al. | |
| 5,557,722 A | 9/1996 | DeRose et al. | |
| 5,598,557 A | 1/1997 | Doner et al. | |
| 5,613,032 A | 3/1997 | Cruz et al. | |
| 5,615,309 A | 3/1997 | Bezek et al. | |
| 5,732,400 A | 3/1998 | Mandler et al. | |
| 5,740,245 A | 4/1998 | Bennett et al. | |
| 5,815,392 A | 9/1998 | Bennett et al. | |
| 5,815,639 A | 9/1998 | Bennett et al. | |
| 5,855,000 A * | 12/1998 | Waibel et al. | 704/235 |
| 5,878,186 A | 3/1999 | Bennett et al. | |
| 5,884,256 A | 3/1999 | Bennett et al. | |
| 5,903,721 A | 5/1999 | Sixtus | |
| 5,926,787 A * | 7/1999 | Bennett et al. | 704/235 |
| 5,940,800 A | 8/1999 | Bennett et al. | |
| 5,949,952 A | 9/1999 | Bennett et al. | |
| 5,950,194 A | 9/1999 | Bennett et al. | |
| 5,970,141 A | 10/1999 | Bennett et al. | |
| 5,986,655 A | 11/1999 | Chiu et al. | |
| 6,014,645 A | 1/2000 | Cunningham | |
| 6,023,675 A | 2/2000 | Bennett et al. | |
| 6,026,395 A | 2/2000 | Bennett et al. | |
| 6,029,149 A | 2/2000 | Dykstra et al. | |
| 6,055,531 A | 4/2000 | Bennett et al. | |
| 6,088,686 A | 7/2000 | Walker et al. | |
| 6,091,835 A | 7/2000 | Smithies et al. | |
| 6,167,385 A | 12/2000 | Harley-Urquhart | |
| 6,175,822 B1 | 1/2001 | Jones | |
| 6,208,979 B1 | 3/2001 | Sinclair | |
| 6,282,510 B1 | 8/2001 | Bennett et al. | |
| 6,311,169 B2 | 10/2001 | Duhon | |
| 6,393,436 B1 | 5/2002 | Vaimber-Araujo | |
| 6,405,181 B2 | 6/2002 | Lent et al. | |
| 6,434,607 B1 | 8/2002 | Haverstock et al. | |
| 6,453,306 B1 | 9/2002 | Quelene | |
| 6,466,981 B1 | 10/2002 | Levy | |
| 6,477,575 B1 | 11/2002 | Koeppel et al. | |
| 6,484,149 B1 | 11/2002 | Jammes et al. | |
| 6,490,557 B1 * | 12/2002 | Jeppesen | 704/235 |
| 6,507,823 B1 | 1/2003 | Nel | |
| 6,567,791 B2 | 5/2003 | Lent et al. | |
| 6,587,841 B1 | 7/2003 | DeFrancesco et al. | |
| 6,658,393 B1 | 12/2003 | Basch et al. | |
| 6,675,142 B2 * | 1/2004 | Ortega et al. | 704/235 |
| 6,766,302 B2 | 7/2004 | Bach | |
| 6,795,812 B1 | 9/2004 | Lent et al. | |
| 6,847,942 B1 | 1/2005 | Land et al. | |
| 6,868,395 B1 | 3/2005 | Szlam et al. | |
| 6,898,570 B1 | 5/2005 | Tedesco et al. | |
| 6,928,412 B2 | 8/2005 | DeBiasse | |
| 6,957,192 B1 | 10/2005 | Peth | |
| 6,988,085 B2 | 1/2006 | Hedy | |
| 7,047,219 B1 | 5/2006 | Martin et al. | |
| 7,082,412 B1 | 7/2006 | Treider et al. | |
| 7,103,568 B1 | 9/2006 | Fusz et al. | |
| 7,127,395 B1 * | 10/2006 | Gorin et al. | 704/257 |
| 7,249,026 B1 | 7/2007 | Bennett et al. | |
| 2001/0037288 A1 | 11/2001 | Bennett et al. | |
| 2001/0039516 A1 | 11/2001 | Bennett et al. | |
| 2002/0049588 A1 | 4/2002 | Bennett et al. | |
| 2007/0239446 A1 | 10/2007 | Bennett et al. | |
| 2007/0250315 A1 | 10/2007 | Bennett et al. | |
| 2007/0260457 A1 | 11/2007 | Bennett et al. | |
| 2007/0260472 A1 | 11/2007 | Bennett et al. | |
| 2007/0265845 A1 | 11/2007 | Bennett et al. | |
| 2007/0265871 A1 | 11/2007 | Bennett et al. | |
| 2007/0266018 A1 | 11/2007 | Bennett et al. | |
| 2007/0286573 A1 | 12/2007 | Bennett et al. | |
| 2008/0015885 A1 | 1/2008 | Bennett et al. | |

FOREIGN PATENT DOCUMENTS

| | | | |
|---|---|---|---|
| WO | WO-9422246 A2 | 9/1994 | |

OTHER PUBLICATIONS

*CaseView: Reference Manual*, Stenograph Corporation,(1992),p. i, 1-28 (33 pgs.).

*OmniCat II: User's Manual*, Stenograph Corporation,(1991),p. L7-6, L8-8.

*Computers for Judges: An Evaluation of Real-Time Computer Aided Transcription*, Society for Computers & Law,(Oct. 1992),p. 4-5.

*Real-Time Discovery zx Version 3.1: User Guide*, Stenograph Legal Services, Inc., San Leandro, CA,(Oct. 2, 1991),p. 1-34.

*Discovery: User Manual*, Xscribe Corporation, following pages: Intro: 1-18; Maintenance: 1-12; View/Edit: 1-20; Reports: 9-11; Exercises: 1-8; Invoking: 1-6; Installation: 1-8; Conversation: 1-6; DOS Commands: 1-8; Glossary: 1-8; Index: 1-7,(1989).

*Summation II: Reference Manual, Version 2.0*, Summation Legal Technologies, Inc.,(Feb. 1990),p. i-v; p. 6-1-6-22; p. 7-1-7-9; p. 8-1-8-20; p. 9-1-9-19.

*Flexcap User's Manual*, Manual #905-0397-000 Rev. C, Software Version 3.0, Xscribe Corporation,(1990),p. B-2-B-4.

*Word for Word—The Newsletter for Stenograph Customers, vol. 1, No. 1*, (Winter, 1992),p. 1-12.

*DiscoveryVideo zx: User's Guide*, Stenograph Corporation,(1991),30 pgs.

" 'CaseView' Advertisement", *Journal of Court Reporting*, 53(5), (1992),2 pgs.

"'CaseView' Commands", Product Brochure, Stenograph Corporation,(Dec. 14, 1992),1 pg.

"'Discovery': Quick Reference Card", Product Brochure, Xscribe Corporation,(2001),3 pgs.

"A Computer-Integrated Courtroom: A Cost-Benefit Analysis of a United States District Court", *The Circuit Rider*, (Jul.-Sep. 1993),13, 15, 17, 19.

"U.S. Appl. No. 08/036,488, Non-Final Office Action mailed Sep. 27, 1993", 2 pgs.

"U.S. Appl. No. 08/036,488, Notice of Allowance mailed Apr. 20, 1994", 5 pgs.

"U.S. Appl. No. 08/036,488, Preliminary Amendment mailed Jul. 23, 1993", 1 pgs.

"U.S. Appl. No. 08/036,488, Response filed Mar. 29, 1994 to Non-Final Office Action mailed Sep. 27, 1993", 16 pgs.

"U.S. Appl. No. 08/065,132, Final Office Action mailed Dec. 13, 1995", 16 pgs.

"U.S. Appl. No. 08/065,132, Non-Final Office Action mailed Jan. 24, 1995", 1 pg.

"U.S. Appl. No. 08/065,132, Notice of Appeal filed Mar. 13, 1997", 2 pgs.

"U.S. Appl. No. 08/065,132, Response filed Jun. 26, 1995 to Non-Final Office Action mailed Jan. 24, 1995", 12 pgs.

"U.S. Appl. No. 08/065,163, Response filed Jul. 10, 1995 to Non-Final Office Action mailed Feb. 9, 1995", 8 pgs.

"U.S. Appl. No. 08/065,163, Non-Final Office Action mailed Feb. 9, 2005", 12 pgs.

"U.S. Appl. No. 08/065,163, Notice of Allowance mailed Sep. 25, 1995", 2 pgs.

"U.S. Appl. No. 08/065,163, Preliminary Amendment filed Feb. 1, 1995", 6 pgs.

"U.S. Appl. No. 08/066,948, Advisory Action mailed Apr. 10, 1998", 2 pgs.

"U.S. Appl. No. 08/066,948, Advisory Action mailed May 1, 1998", 2 pgs.

"U.S. Appl. No. 08/066,948, Final Office Action mailed Mar. 11, 1997", 3 pgs.

"U.S. Appl. No. 08/066,948, Final Office Action mailed Mar. 23, 1998", 4 pgs.

"U.S. Appl. No. 08/066,948, Non-Final Office Action mailed Mar. 29, 1994", 4 pgs.

"U.S. Appl. No. 08/066,948, Non-Final Office Action mailed Dec. 22, 1994", 4 pgs.

"U.S. Appl. No. 08/066,948, Notice of Allowance mailed Aug. 14, 1998", 4 pgs.

"U.S. Appl. No. 08/066,948, Response filed Apr. 2, 1998 to Final Office Action mailed Mar. 23, 1998", 3 pgs.

"U.S. Appl. No. 08/066,948, Response filed Apr. 22, 1998 to Advisory Action mailed Apr. 10, 1998", 4 pgs.

"U.S. Appl. No. 08/066,948, Response filed Jun. 22, 1995 to Non-Final Office Action mailed Dec. 22, 1994", 2 pgs.

"U.S. Appl. No. 08/066,948, Response filed Jul. 23, 1998 to Final Office Action mailed Mar. 23, 1998", 4 pgs.

"U.S. Appl. No. 08/066,948, Response filed Sep. 29, 1994 to Non-Final Office Action mailed Mar. 29, 1994", 9 pgs.

"U.S. Appl. No. 08/073,809, Non-Final Office Action mailed Feb. 17, 1994", 13 pgs.

"U.S. Appl. No. 08/073,809, Non-Final Office Action mailed Sep. 20, 1994", 3 pgs.

"U.S. Appl. No. 08/073,809, Response filed Aug. 17, 1994 to Non-Final Office Action mailed Feb. 17, 1994", 8 pgs.

"U.S. Appl. No. 08/326,742, Notice of Allowance mailed Feb. 22, 1995", 3 pgs.

"U.S. Appl. No. 08/326,742, Preliminary Amendment mailed Oct. 20, 1994", 5 pgs.

"U.S. Appl. No. 08/339,771, Non-Final Office Action mailed Mar. 22, 1995", 3 pgs.

"U.S. Appl. No. 08/339,771, Notice of Allowance mailed Jan. 8, 1996", 2 pgs.

"U.S. Appl. No. 08/339,771, Preliminary Amendment mailed Nov. 15, 1994", 4 pgs.

"U.S. Appl. No. 08/339,771, Response filed Aug. 22, 1995 to Non-Final Office Action mailed Mar. 22, 1995", 2 pgs.

"U.S. Appl. No. 08/518,102, Notice of Allowance mailed Feb. 9, 1996", 4 pgs.

"U.S. Appl. No. 08/518,102, Preliminary Amendment mailed Aug. 22, 1995", 3 pgs.

"U.S. Appl. No. 08/818,402, Final Office Action mailed Mar. 23, 1999", 6 pgs.

"U.S. Appl. No. 08/818,402, Non-Final Office Action mailed Jun. 26, 1998", 2 pgs.

"U.S. Appl. No. 08/818,402, Non-Final Office Action mailed Sep. 21, 1998", 5 pgs.

"U.S. Appl. No. 08/818,402, Non-Final Office Action mailed Nov. 26, 1997", 5 pgs.

"U.S. Appl. No. 08/818,402, Non-Final Office Action mailed Dec. 30, 1998", 4 pgs.

"U.S. Appl. No. 08/818,402, Notice of Allowance mailed Apr. 30, 1999", 3 pgs.

"U.S. Appl. No. 08/818,402, Preliminary Amendment mailed Mar. 25, 1998", 15 pgs.

"U.S. Appl. No. 08/818,402, Response filed Jan. 15, 1999 to Non-Final Office Action mailed Dec. 30, 1998", 7 pgs.

"U.S. Appl. No. 08/818,402, Response filed Apr. 12, 1999 to Final Office Action mailed Mar. 23, 1999", 4 pgs.

"U.S. Appl. No. 08/818,402, Response filed Jul. 10, 1998 to Non-Final Office Action Jun. 26, 1998", 4 pgs.

"U.S. Appl. No. 08/818,402, Response filed Oct. 20, 1998 to Non-Final Office Action mailed Sep. 21, 1998", 8 pgs.

"U.S. Appl. No. 08/877,719, Notice of Allowance mailed Dec. 21, 1998", 5 pgs.

"U.S. Appl. No. 09/057,650, Non-Final Office Action mailed Apr. 9, 1999", 6 pgs.

"U.S. Appl. No. 09/057,650, Non-Final Office Action mailed Jun. 2, 1999", 5 pgs.

"U.S. Appl. No. 09/057,650, Non-Final Office Action mailed Sep. 22, 1998", 4 pgs.

"U.S. Appl. No. 09/057,650, Notice of Allowance mailed Jul. 19, 1999", 5 pgs.

"U.S. Appl. No. 09/057,650, Response filed Jun. 11, 1999 to Non-Final Office Action mailed Jun. 2, 1999", 2 pgs.

"U.S. Appl. No. 09/057,650, Response filed Oct. 5, 1998 to Non-Final Office Action mailed Sep. 22, 1998", 5 pgs.

"U.S. Appl. No. 09/057,780, Non-Final Office Action mailed Sep. 3, 1998", 13 pgs.

"U.S. Appl. No. 09/057,780, Notice of Allowance mailed Nov. 3, 1998", 3 pgs.

"U.S. Appl. No. 09/057,780, Response filed Sep. 24, 1998 to Non-Final Office Action mailed Sep. 3, 1998", 7 pgs.

"U.S. Appl. No. 09/144,576, Notice of Allowance mailed May 10, 1999", 5 pgs.

"U.S. Appl. No. 09/144,576, Preliminary Amendment mailed Aug. 31, 1998", 6 pgs.

"U.S. Appl. No. 09/144,576, Preliminary Amendment mailed Sep. 21, 1998", 2 pgs.

"U.S. Appl. No. 09/144,576, Preliminary Amendment mailed Nov. 6, 1998", 4 pgs.

"U.S. Appl. No. 09/144,582, Non-Final Office Action mailed Dec. 8, 1998", 10 pgs.

"U.S. Appl. No. 09/144,582, Notice of Allowance mailed Mar. 10, 1999", 4 pgs.
"U.S. Appl. No. 09/144,582, Preliminary Amendment filed Aug. 31, 1998", 5 pgs.
"U.S. Appl. No. 09/144,582, Response filed Feb. 5, 1999 to Non-Final Office Action mailed Dec. 8, 1998", 5 pgs.
"U.S. Appl. No. 09/185,114, Non-Final Office Action mailed Apr. 13, 1999", 4 pgs.
"U.S. Appl. No. 09/185,114, Non-Final Office Action mailed Jul. 21, 1999", 5 pgs.
"U.S. Appl. No. 09/185,114, Notice of Allowance mailed Oct. 25, 1999", 3 pgs.
"U.S. Appl. No. 09/185,114, Preliminary Amendment mailed Nov. 3, 1998", 11 pgs.
"U.S. Appl. No. 09/185,114, Response filed Apr. 23, 1999 to Non-Final Office Action mailed Apr. 13, 1999", 7 pgs.
"U.S. Appl. No. 09/185,114, Response filed Aug. 5, 1999 to Non-Final Office Action mailed Jul. 21, 1999", 3 pgs.
"U.S. Appl. No. 09/330,516, Final Office Action mailed Oct. 19, 2000", 24 pgs.
"U.S. Appl. No. 09/330,516, Non-Final Office Action mailed Apr. 6, 2000", 12 pgs.
"U.S. Appl. No. 09/330,516, Preliminary Amendment mailed Jun. 11, 1999", 3 pgs.
"U.S. Appl. No. 09/330,516, Response filed Sep. 6, 2000 to Non-Final Office Action mailed Apr. 6, 2000", 10 pgs.
"U.S. Appl. No. 09/332,317, Advisory Action mailed Jul. 12, 2005", 2 pgs.
"U.S. Appl. No. 09/332,317, Final Office Action mailed Mar. 14, 2005", 9 pgs.
"U.S. Appl. No. 09/332,317, Final Office Action mailed Apr. 27, 2005", 14 pgs.
"U.S. Appl. No. 09/332,317, Non-Final Office Action mailed Jan. 22, 2003", 7 pgs.
"U.S. Appl. No. 09/332,317, Non-Final Office Action mailed Feb. 2, 2006", 4 pgs.
"U.S. Appl. No. 09/332,317, Non-Final Office Action mailed Mar. 8, 2002", 7 pgs.
"U.S. Appl. No. 09/332,317, Non-Final Office Action mailed Apr. 20, 2001", 10 pgs.
"U.S. Appl. No. 09/332,317, Non-Final Office Action mailed Oct. 1, 2003", 8 pgs.
"U.S. Appl. No. 09/332,317, Non-Final Office Action mailed Nov. 6, 2000", 17 pgs.
"U.S. Appl. No. 09/332,317, Notice of Allowance mailed Feb. 22, 2007", 7 pgs.
"U.S. Appl. No. 09/332,317, Notice of Allowance mailed Dec. 20, 1999", 5 pgs.
"U.S. Appl. No. 09/332,317, Preliminary Amendment mailed Jun. 14, 1999", 6 pgs.
"U.S. Appl. No. 09/332,317, Response filed Feb. 6, 2001 to Non-Final Office Action mailed Nov. 6, 2000", 3 pgs.
"U.S. Appl. No. 09/332,317, Response filed Mar. 30, 2004 to Non-Final Office Action mailed Oct. 1, 2003", 14 pgs.
"U.S. Appl. No. 09/332,317, Response filed May 25, 2005 to Supplemental Final Office Action mailed Apr. 27, 2005", 11 pgs.
"U.S. Appl. No. 09/332,317, Response filed Jul. 21, 2003 to Non-Final Office Action mailed Jan. 22, 2003", 5 pgs.
"U.S. Appl. No. 09/332,317, Response filed Sep. 6, 2002 to Non-Final Office Action mailed Mar. 8, 2002", 3 pgs.
"U.S. Appl. No. 09/332,317, Response filed Oct. 17, 2001 to Non-Final Office Action mailed Jan. 3, 2002", 7 pgs.
"U.S. Appl. No. 09/345,910, Notice of Allowance mailed Sep. 7, 1999", 6 pgs.
"U.S. Appl. No. 09/345,910, Preliminary Amendment filed Aug. 30, 1999", 2 pgs.
"U.S. Appl. No. 09/422,202, Non-Final Office Action mailed Jul. 16, 2007", 3 pgs.
"U.S. Appl. No. 09/422,202 Response filed Jan. 16, 2008 to Non-Final Office Action mailed Jul. 16, 2007", 12 p.
"U.S. Appl. No. 09/422,202, Non-Final Office Action mailed Oct. 17, 2006", 6 pgs.
"U.S. Appl. No. 09/422,202, Non-Final Office Action mailed Oct. 24, 2003", 7 pgs.
"U.S. Appl. No. 09/422,202, Preliminary Amendment filed Oct. 19, 1999", 3 pgs.
"U.S. Appl. No. 09/422,202, Preliminary Amendment mailed Apr. 17, 2000", 6 pgs.
"U.S. Appl. No. 09/422,202, Response filed Apr. 17, 2007 to Non-Final Office Action Mailed Oct. 17, 2006", 11 pgs.
"U.S. Appl. No. 09/498,192, Notice of Allowance mailed Apr. 24, 2001", 4 pgs.
"U.S. Appl. No. 09/498,192, Preliminary Amendment filed Feb. 3, 2000", 10 pgs.
"U.S. Appl. No. 09/500,559, Non-Final Office Action mailed Sep. 5, 2001", 8 pgs.
"U.S. Appl. No. 09/808,722, Non-Final Office Action mailed Jan. 29, 2007", 7 pgs.
"U.S. Appl. No. 09/808,723, Non-Final Office Action mailed Jan. 29, 2007", 7 pgs.
"U.S. Appl. No. 09/837,752 Notice of Allowance mailed Jan. 2, 2008", 6 pgs.
"U.S. Appl. No. 09/837,752, Amendment and Response filed Dec. 4, 2006 to Final Office Action mailed Sep. 25, 2006", 3 pgs.
"U.S. Appl. No. 09/837,752, Final Office Action mailed Jun. 25, 2004", 7 pgs.
"U.S. Appl. No. 09/837,752, Final Office Action mailed Sep. 25, 2006", 7 pgs.
"U.S. Appl. No. 09/837,752, Final Office Action mailed Nov. 2, 2005", 10 pgs.
"U.S. Appl. No. 09/837,752, Non-Final Office Action mailed May 20, 2005", 6 pgs.
"U.S. Appl. No. 09/837,752, Non-Final Office Action mailed Sep. 24, 2003", 7 pgs.
"U.S. Appl. No. 09/837,752, Non-Final Office Action mailed Dec. 18, 2002", 7 pgs.
"U.S. Appl. No. 09/837,752, Notice of Allowance mailed Jan. 10, 2007", 4 pgs.
"U.S. Appl. No. 09/837,752, Notice of Allowance mailed Mar. 31, 2006", 4 pgs.
"U.S. Appl. No. 09/837,752, Notice of Allowance mailed Jun. 18, 2007", 5 pgs.
"U.S. Appl. No. 09/837,752, Preliminary Amendment filed Apr. 17, 2001", 5 pgs.
"U.S. Appl. No. 09/837,752, Response filed Mar. 23, 2004 to Non-Final Office Action mailed Jan. 16, 2004", 7 pgs.
"U.S. Appl. No. 09/837,752, Response filed Jun. 17, 2003 to Non-Final Office Action mailed Dec. 18, 2002", 6 pgs.
"U.S. Appl. No. 09/837,752, Response filed Aug. 22, 2005 to Non Final Office Action mailed May 20, 2005", 8 pgs.
"U.S. Appl. No. 09/940,775, Amendment filed May 17, 2002", 6 pgs.
"U.S. Appl. No. 09/940,775, Non-Final Office Action mailed Feb. 26, 2002", 4 pgs.
"U.S. Appl. No. 09/940,775, Notice of Allowance mailed May 14, 2002", 4 pgs.
"U.S. Appl. No. 09/940,775, Notice of Allowance mailed May 22, 2002", 2 pgs.
"U.S. Appl. No. 09/940,775, Preliminary Amendment mailed Aug. 27, 2001", 11 pgs.
"U.S. Appl. No. 09/940,775, Response Filed Mar. 19, 2002 to Non-Final Office Action mailed Feb. 26, 2002", 3 pgs.
"U.S. Appl. No. 11/559,216, Notice of Allowance mailed Dec. 31, 2007", 6 pgs.
"U.S. Appl. No. 11/559,216, Preliminary Amendment filed Jul. 20, 2007", 3 pgs.
"U.S. Appl. No. 11/559,216, Preliminary Amendment filed Nov. 13, 2006", 4 pgs.
"U.S. Appl. No. 11/559,233, Preliminary Amendment mailed Nov. 13, 2006", 5 pgs.
"U.S. Appl. No. 11/559,246, Preliminary Amendment Nov. 13, 2006", 5 pgs.
"U.S. Appl. No. 11/559,251, Preliminary Amendment filed Nov. 13, 2006", 5 pgs.
"U.S. Appl. No. 11/559,264, Preliminary Amendment filed Nov. 13, 2006", 5 pgs.

"U.S. Appl. No. 11/559,283, Preliminary Amendment filed Nov. 13, 2006", 4 pgs.

"U.S. Appl. No. 11/559,297, Preliminary Amendment filed Feb. 20, 2007", 3 pgs.

"U.S. Appl. No. 11/559,297, Preliminary Amendment filed Nov. 13, 2006", 3 pgs.

"U.S. Appl. No. 11/559,299, Preliminary Amendment filed Nov. 13, 2006", 4 pgs.

"U.S. Appl. No. 11/559,312, Preliminary Amendment filed Feb. 20, 2007", 4 pgs.

"U.S. Appl. No. 11/559,312, Preliminary Amendment filed Nov. 13, 2006", 3 pgs.

"U.S. Appl. No. 11/779,771, Preliminary Amendment filed Jul. 18, 2007", 4 pgs.

"U.S. Appl. No. 09/144,591, Non-Final Office Action mailed Jan. 7, 1999", 10 pgs.

"U.S. Appl. No. 9/144,591, Notice of Allowance mailed Jun. 3, 1999", 4 pgs.

"U.S. Appl. No. 9/144,591, Preliminary Amendment filed Aug. 31, 1998", 5 pgs.

"U.S. Appl. No. 9/144,591, Response filed Apr. 7, 1999 to Non-Final Office Action mailed Jan. 7, 1999", 7 pgs.

"Caseview: The Attorney's Future Connection", Transcription of 1992 Videotape, Stenograph Corporation,(1992),5 pgs.

"CIC Receive Reference Manual (Rev. A)", OZ PC,(Aug. 1990),p. 1-17.

"Court speeds justice by putting records and court papers on-line", *PC Week*, 5, Obtained from Dialog, Accession No. 03083868,(Mar. 29, 1988), 3 p.

"Definition of 'Terminal'", [on-line]. [retrieved Feb. 23, 2004]. Retrieved from the Internet: <URL: http://dictionary/reference.com/search?q=terminal>,5 pgs.

"Definition of 'Terminal'", *IBM Dictionary of Computing*, McDaniel, G., Editor, McGraw-Hill, Inc.,(Aug. 1993),p. 686.

"Definition of 'Terminal'", *Ninth New Collegiate Dictionary*, Merriam-Webster, Inc., Springfield, MA,(1985),p. 1217.

"Discovery Products Annouces DiscoveryRealtime Compatibility With DiscoveryPro Software", *Business Wire*, (Mar. 26, 1996),1 pg.

"Discovery Video zx Litigation System", Product Brochure, Stenograph Legal Services, Inc., San Ramon, CA,2 pgs.

"Discovery ZX: Quick Reference Card", Labeled: 'David Langford, CSR, CM, 1991 NCRA Midyear Seminar, New Orleans Marriott, RealTime Spectacular, Part 3, The Computer-Integrated Courtroom, Saturday, Apr. 27, 1991',(1991),4 pgs.

"DiscoveryVideo zx by Stenograph Legal Services", Product Brochure, Stenograph Legal Services, National Sales Meeting, St. Charles, IL,(Jul. 1991),6 pgs.

"Have You Been Dreaming About Little Voices?", 'Discovery Video zx' Product Advertisement, Stenograph Legal Services, Inc.,(1991),1 pg.

"Instructions—OZpc Video zx Convert Program", Stenograph Legal Services, San Leandro, CA,(1991),35 pgs.

"International Application Serial No. PCT/US94/03218, International Search Report mailed Sep. 14, 1994", 5 pgs.

"Legal Tech' 88 Visitors View Automated Support Systems", *Government Computer News*, 7, (Apr. 1, 1988),1 p.

"LiveNote Tutorial (Version 1.0)", *LiveNote: User's Guide*, LiveNote Technologies,p. 12, 20, 21, 65, 74, 97-99, 117-120, 141, 142, 166, 167, 192, 193, 203-207, 237 (25 pgs.).

"Menu Selection for Realtime Discovery in XCIC", *Exhibit to Declaration of Brent Sandstrom, Engate, Inc. v. Esquire Deposition Services, LLC (USDC, ND of Ill)*, [page from Ref. i.d. #237734—no need to cite separarely],(prior to Oct. 31, 2003),1 pg.

"OZ: Computer-Integrated Courtroom Reporter Guide", BaronData Systems,(1988),p. 4-4-4-5.

"Print-out of Database Search for 'Stenograph, LLC/ . . . Stenograph Computer Systems, Inc'", Retrieved from the Internet: <URL: http://www.loc.gov/cgi-bin/formprocessor/copyright/locis.pl>,(retrieved Feb. 27, 2004),9 pgs.

"Realtime Software for Attorneys", [online]. [retrieved on Apr. 2, 2003]. Retrieved from the Internet: <URL: http://www.depo.com/rtsoftware.htm>,1 pg.

"Stenograph Legal Services Unveils New Litigation Support Project", Press Release, Stenograph Corporation,(Apr. 12, 1991),3 pgs.

"Technologies in Court Reporting", Program Materials, Institute for Court Management of the National Center for State Courts and National Court Reporters Association, San Diego, CA,(Mar. 20-22, 1991),Tab 1: p. 1-20; Tab 5: p. 1-47.

"The Courtroom of the Future", *Time*, (Aug. 4, 1986),1 pg.

Andrews, F. , "Computer-Integrated Courtrooms: Enhancing Advocacy", *Trial* (Sep. 1992),37-39.

Berry, R. L., et al., "Conducting Depositions Anywhere", *The National Law Journal*, (2001),p. B-15-B-17.

Bichy, C. L., "Innovative Partnership Produces Technology Laboratory", *Journal of Court Reporting*, (Mar. 1992),p. 28.

Block, M. H., "Moving the Judicial System into the Twenty-First Century", *Trial* (Sep. 1990),51-52.

Brentano, M. , "A History of CAT—From the CIA to the CIC", *NSR*, (Jul. 1990),24-26.

Cusack, S. , "Reading with electronic eyes", *Computerworld*, (Oct. 1, 1990),p. 41.

Dagdigian, D. , "Update: Computerized Federal—Chicago", *NSR*, (Jul. 1987), p. 26.

Dean, S. , "Teaching Attorneys and the Public About Our Technologies", *Journal of Court Reporting*, (Apr. 1992),26-30.

Forerstel, K. , "House Debate Now Available Closed-Caption", *Roll Call*, obtained from LexisNexis,(Feb. 25, 1991),1 pg.

Fruke, L. M., "How Do You Furnish a CIC?", *NSR*, (Aug. 1990),p. 71.

Hazlett, B. , "Computer Also on Trial in L.A. Courtroom", *Los Angeles Times*, (1982),p. 3, p. 24.

Johnston, D. R., "Computers: Shorthand for Change", *Fulton County Daily Report*, (Mar. 13, 1989),2 pgs.

Karlovits, J. R., "TAC and Its Effect on Our Profession", *Journal of Court Reporting*, (Jul. 1992),24-25.

Karlovits, J. R., "What Is a Computer-Integrated Courtroom. Anyway?", *NSR*, (Feb. 1990),p. 72.

Knapp, M. H., *The Complete Court Reporter's Handbook*, Second Edition, Regents/Prentice Hall, Englewood Cliffs, NJ,(1991),327-328.

Knox, D. "Phoenix's Courtroom of the Future", *The American Lawyer—Technology 1991*, (1991),p. 4-6, p. 10.

Madden, R. F., "The Coming of the Electronic Courtroom", *Yearbook of Law Computers and Technology*, vol. 5, (1991),p. 9-18.

Malt, L. , "Behind the Screen: Getting Captions on the Air", *Electronic Media*, Obtained from LexisNexis,(Mar. 19, 1990),2 pgs.

McNutt, III, W. A., "Courtrooms—Phoenix", *NSR*, (Jul. 1987),p. 27.

Nelson, F. O., "A Real-Time Case History", *NSR*, (May, 1989),p. 22.

Plotnikoff, J. , et al., *Evaluation of the Smith Bernal Real-Time Computer Aided Transcript System, Solution CIC*, Report on behalf of Society for Computers and Law,(Apr. 1992),p. 1-23.

Plotnikoff, J. , et al., "Replacing the Judge's Pen? Evaluation of a Real-Time Transcription System", *International Journal of Law and Information Technology*, 1(1), (1993),90-106.

Prout, Jr., J. J., "Technology to Help the Disabled and Everyone Else", *New Jersey Lawyer*, (Dec. 21, 1992),2 pgs.

Rabiner, L. , et al., *In: Fundamentals of Speech Recognition*, Prentice Hall PTR, Englewood Cliff, NJ,(1993),pp.1, 478-479.

Rizman, S. , "Total Access Courtroom—Unveiled in New Jersey", *The Journal of Court Reporting*, (Dec. 1992),36-37, 39.

Rogner, B. M., "The Courtroom of the Future", *NSR* (May 1985),18-19.

Rothman, R. L., "The Computer Age is Coming, The Computer Age is Coming", *Litigation News*, 16(4), (1991),2 pgs.

Sanchez, M. A., "The Computer-Integrated Courtroom", *Hearsay*, (Oct. 1990),4 pgs.

Sanchez, M. , et al., "The Phoenix CIC Six Years Later", *Journal of Court Reporting*, (Apr. 1992),49-50, 52.

Shorak, B. J., "Computer Courtrooms—Views of the National Shorthand Reporters Association", *The Advocate*, (Oct. 1989),42-43.

Strand, R. G., *The Computer-Integrated Courtroom: A Demonstration*, Federal Judicial Center, Conference of Chief District Judges, Phoenix, Arizona,(Apr. 6, 1989),p. 1-14.

Strand, R. C., "The Courtroom of the Future", *The Judge's Journal*, 28(2), (Spring, 1989),9-11, 47-48.

Williams, J., et al., *Advanced Court Report Technology—Computer Concepts*, Middletown/Wasley Publishing, p. 6-2-6.5.

Wolffe, J., *United Press International: Domestic News*, Re: Real-Time Close Captioning, Nov. 15, 1991, Friday, BC Cycle, 2 pgs.

"U.S. Appl. No. 09/422,202, Non-Final Office Action mailed May 22, 2008", OARN, 18 pgs.

"U.S. Appl. No. 11/559,297, Non-Final Office Action mailed Jun. 2, 2008", OARN, 20 pgs.

"U.S. Appl. No. 09/422,202, Non-Final Office Action mailed Feb. 18, 2009", 5 pgs.

"U.S. Appl. No. 09/422,202, Response filed Nov. 24, 2008 to Non Final Office Action mailed May 22, 2008", 9 pgs.

"U.S. Appl. No. 09/837,752, Non-Final Office Action mailed Jan. 9, 2009", 9 pgs.

"U.S. Appl. No. 11/559,216, Notice of Allowance mailed Dec. 30, 2008", 5 pgs.

"U.S. Appl. No. 11/559,246, Non-Final Office Action mailed Oct. 3, 2008.", 5 pgs.

"U.S. Appl. No. 11/559,246, Response filed Mar. 3, 2009 to Non Final Office Action mailed Oct. 3, 2008", 5 pgs.

"U.S. Appl. No. 11/559,264, Non-Final Office Action mailed Jul. 2, 2008", 5 pgs.

"U.S. Appl. No. 11/559,297, Final Office Action mailed Mar. 6, 2009", 5 pgs.

"U.S. Appl. No. 11/559,297, Response filed Dec. 2, 2008 to Non Final Office Action mailed Jun. 2, 2008", 11 pgs.

"U.S. Appl. No. 11/779,771, Non-Final Office Action mailed Dec. 23, 2008", 8 pgs.

"The Computer-Integrated Courtroom: A Demonstration", *Federal Judicial Center*, Conference of Chief District judges, Pheonix, Arizona, (Apr. 6, 1989), 14 pgs.

"U.S. Appl. No. 11/559,264, Non Final Office Action mailed Apr. 7, 2009", 9 pgs.

"U.S. Appl. No. 11/559,264, Response filed Jan. 2, 2009 to Non-Final Office Action mailed Jul. 2, 2008", 6 pgs.

"U.S. Appl. No. 11/559,297, Non-Final Office Action mailed Jun. 11, 2009", 21 pgs.

"U.S. Appl. No. 11/559,297, Response filed May 6, 2009 to Final Office Action mailed Mar. 6, 2009", 10 pgs.

"U.S. Appl. No. 11/779,771, Response filed Mar. 23, 2009 to Non Final Office Action mailed Dec. 23, 2008", 9 pgs.

"U.S. Appl. No. 09/422,202, Notice of Allowance mailed Jun. 29, 2009", 6 pgs.

"U.S. Appl. No. 09/422,202, Response filed May 18, 2009 to Non-Final Office Action mailed Feb. 18, 2009", 8 pgs.

"U.S. Appl. No. 09/837,752, Response filed Jul. 9, 2009 to Non Final Office Action mailed Jan. 9, 2009", 8 pgs.

"U.S. Appl. No. 11/559,216, Non-Final Office Action mailed Sep. 21, 2009", 7 pgs.

"U.S. Appl. No. 11/559,246 Final Office Action Response filed Oct. 26, 2009 to Final Office Action mailed Jun. 25, 2009", 8 pgs.

"U.S. Appl. No. 11/559,246, Final Office Action mailed Jun. 25, 2009", 6 pgs.

"U.S. Appl. No. 11/559,264, Response filed Jul. 7, 2009 to Non Final Office Action mailed Apr. 7, 2009", 7 pgs.

"U.S. Appl. No. 11/559,283, Non-Final Office Action mailed Jun. 24, 2009", 9 pgs.

"U.S. Appl. No. 11/559,299, Non-Final Office Action mailed Jun. 23, 2009", 7 pgs.

"U.S. Appl. No. 11/559,312, Non-Final Office Action mailed Sep. 21, 2009", 5 Pgs.

"U.S. Appl. No. 11/779,771, Final Office Action mailed Jul. 14, 2009", 26 pgs.

U.S. Appl. No. 09/837,752, Non-Final Office Action mailed Nov. 18, 2009, 10 pages.

U.S. Appl. No. 11/559,216, Final Office Action mailed Mar. 16, 2010, 5 pages.

* cited by examiner

FOREIGN LANGUAGE TABLE ~27

| identified_CT_string ~403 | corresponding_translation ~405 |
|---|---|
| "beach" ~407 | "playa" ~409 |
| "good" ~411 | "bueno" ~413 |
| "you" ~415 | "usted" ~417 |

COMPUTER-AIDED TRANSCRIPTION SYSTEM USING PRONOUNCEABLE SUBSTITUTE TEXT WITH A COMMON CROSS-REFERENCE LIBRARY

CROSS-REFERENCE TO RELATED APPLICATIONS (CLAIMING BENEFIT UNDER 35 U.S.C. 120)

This application is a continuation of co-pending U.S. patent application Ser. No. 09/837,752, entitled "Computer-Aided Transcription System Using Pronounceable Substitute Text With A Common Cross-Reference Library," filed Apr. 17, 2001, which is a continuation of abandoned U.S. patent application Ser. No. 09/330,516, entitled "Computer-Aided Transcription System Using Cross-Reference Text For Language Translation," filed Jun. 11, 1999 now abandoned, which is a continuation of U.S. patent application Ser. No. 09/144,582, entitled "Computer-Aided Transcription System Using Pronounceable Substitute Text With A Common Cross-Reference Library," filed Aug. 31, 1998, which issued as U.S. Pat. No. 5,926,787 on Jul. 20, 1999, and which is a continuation of U.S. patent application Ser. No. 08/065,163, entitled "Computer-Aided Transcription System Using Pronounceable Substitute Text With A Common Cross-Reference Library," filed May 20, 1993, which issued as U.S. Pat. No. 5,815,639 on Sept. 29, 1998, and which is a continuation-in-part of U.S. patent application Ser. No. 08/036,488, entitled "Down-Line Transcription System For Manipulating Real-Time Testimony," filed Mar. 24, 1993, which issued as U.S. Pat. No. 5,369,704 on Nov. 29, 1994.

The subject matter of the present application is also related to co-pending U.S. patent application Ser. No. 11/559,216, entitled "Computer-Aided Transcription System Using Pronounceable Substitute Text With A Common Cross-Reference Library," filed Nov. 13, 2006.

The complete contents of each of the above referenced United States Patent Applications and United States Patents are hereby incorporated by reference in their entirety.

INCORPORATION BY REFERENCE

The descriptive matter of the above-referred to pending U.S. application Ser. No. 08/036,488, filed Mar. 24, 1993, by Bennett et al. is incorporated herein by reference in its entirety, and is made part of this application.

BACKGROUND OF THE INVENTION

This invention relates to a computer-aided transcription system used by court reporters which provides readable testimony to attorneys, judges, court reporters, witnesses and clients in real-time.

As is well known, legal proceedings such as a deposition or trial involve the participation of, among others, an examining attorney who asks questions and a witness who must answer ("testify") while under oath. These answers ("testimony") are recorded by a court reporter, along with the associated questions and related conversation, using a stenographic recorder. A stenographic recorder is a machine which provides a set of keys which are stroked by the court reporter in various combinations and sequences to represent spoken words.

Older versions of the stenographic recorder only record the court reporter's key-strokes much the way a computer printer does, creating a paper tape containing the printed key-strokes as a record of the legal proceeding. After the legal proceeding ends, the court reporter reads the paper tape and manually transcribes each printed key-stroke back into the words that were spoken, creating a readable transcript of the testimony. This manual transcription process takes a great deal of time.

Newer versions of the stenographic recorder produce electronic signals representative of each key-stroke recorded. The electronic signals drive computers that help automate the transcription process. These computers are referred to as Computer Aided Transcription ("CAT") systems which translate stenographic key-strokes into text using a court reporter's personalized cross-reference library. These CAT systems only automatically transcribe those key-strokes that have textual counterparts in that court reporter's cross-reference library. Keystrokes having no counterparts must be manually transcribed by the court reporter. The ratio between the number of words automatically transcribed and those requiring manual transcription is referred to herein as the "percentage of automated transcription".

Using the newer versions of recorders and CAT systems, only seasoned, consistent court reporters having well-developed cross-reference libraries can achieve a relatively high percentage of automated transcription, while beginners and inconsistent reporters tend to produce relatively low percentages. Low percentages result in costly inefficiency resulting from the longer period of manual transcription required. Additionally, if real-time down-line transcription is desired, a high percentage of automated transcription becomes critical. In a down-line transcription environment, both counterpart text for transcribed key-strokes and all untranscribed key-strokes are sequentially transmitted down-line to the various attorneys, clients, judges and witnesses for their real-time review. However, in most cases, only court reporters can read untranscribed key-strokes. The down-line reviewers generally cannot comprehend them. As a result, the lower the percentage of automated transcription, the less likely a court reporter will ever be rehired by the down-line attorneys.

The percentage of automated transcription depends on several factors. For example, if a court reporter fails to consistently depress the same stenographic recorder keys for the same word or word sequence, the percentage of automated transcription tends to drop. Currently, to overcome this problem, the court reporter must increase their skill through practice. Beginner court reporters face a more substantial problem. Not only must they learn to consistently stroke the stenographic keys, but they must also enhance and refine their "beginner" cross-reference library so that the desired high percentage of automated transcription can be reached. The enhancement and refining process takes a great deal of time with the end result being a personalized cross-reference library that no other reporter can use.

Additionally, even the most seasoned court reporters cannot anticipate all of the unique or new words and names that will be encountered in an upcoming deposition. As a result, current CAT systems fail to transcribe such words and names. To increase the percentage of automated transcription, court reporters often ask the attorneys for a list of potential unique words and names well before the testimony is recorded so that appropriate refinement of their cross-reference library might be made. However, attorneys cannot remember or anticipate all such words, and, more often than not, forget to provide the requested list. Furthermore, because of the anticipation problem and nature of such words, one hundred percent automated transcription cannot be guaranteed. Thus, incomprehensible, untranscribed key-strokes always reach the down-line reviewers.

Because of personalization, each court reporter must regularly back-up and carry copies of their cross-reference library (usually on disk) in case their library is accidentally lost or damaged. Failure to do so may result in the court reporter not being able to conduct the deposition, and, possibly more devastating, the court reporter may have to start from scratch as would a beginner to develop another cross-reference library. Also resulting from personalization, a court reporter's library cannot be used to transcribe the key-strokes of another reporter. Doing so not only yields a low percentage of automated transcription, but might also result in virtually undetectable, wrong transcription.

To handle depositions or trials involving two or more languages, translators are required. However, using translators creates one significant problem—the validity of the translation. Translators, like any other human, often unknowingly misunderstand what is being said. Even more often, a translator will get sloppy and tend to summarize what they hear. In either case, the transcript becomes flawed. With an increased number of international legal matters, the use of translators with their inherent translation errors continues to grow.

Currently, there are over thirty thousand court reporters and hundreds of thousands of attorneys and judges in the United States alone. Hence, it would be highly desirable to solve the foregoing variety of problems enumerated above facing court reporters and down-line attorneys, judges and witnesses in conducting legal proceedings such as a deposition or trial.

Therefore, it is an object of the present invention to provide a method and apparatus which will aid court reporters in transcription of testimony generated in real-time by an automatic transcription system.

It is another object of the present invention to provide a method and apparatus which will aid court reporters in eliminating the need for personalized transcription libraries for use in transcription of testimony generated in real-time by an automatic transcription system.

A further object of the present invention is to provide a method and apparatus which will aid beginning and inconsistent court reporters in the transcription of testimony generated in real-time by an automatic transcription system.

A further object of the present invention is to provide a method and apparatus which will aid court reporters in the transcription of testimony generated in real-time by an automatic transcription system through use of a fully functional, standard cross reference library.

It is another object of the present invention to provide a method and apparatus which will aid court reporters in developing and maintaining a common cross reference library for use in the transcription of testimony generated by a CAT system.

It is yet another object of the present invention to provide a method and apparatus which will aid court reporters in training themselves to use a standard cross reference library substantially common to all court reporters.

Another object of the present invention is to provide a method and apparatus which will aid court reporters in training themselves to use a common cross reference library.

A further object of the present invention is to provide a method and apparatus which will act as a backup to the cross-reference library in providing automated transcription for testimony generated by an automatic transcription system.

It is another object of the present invention to provide down-line reviewers with comprehensible text representing untranscribed key-strokes representing words or names having no textual counterpart in the cross-reference library.

SUMMARY OF THE INVENTION

These and other objects of the present invention are achieved in a reporting system having a transcriber which operates on coded representations of spoken words and having cross-reference and phoneme libraries. The reporting system comprises a means which uses a cross-reference library for identifying associations between coded representations of spoken words and actual alphabetic and numeric text. A phoneme means provides for associating spoken words with pronounceable text using a phoneme library, and operates on spoken words for which the cross-reference means cannot identify associations.

The reporting system accomplishes other objects by additionally providing a pronunciation index means which operates on representations of spoken words for which the phoneme and cross-reference means cannot identify associations. A phoneme library is also provided which is responsive to the phoneme means by identifying associations between code representations of spoken words and corresponding alphabetical and numeric text. Additionally, foreign language tables are provided by the reporting system to provide for foreign language translation.

Objects are also achieved in a transcription system which operates on coded representations of spoken words. This system comprises a local cross-reference library which is stored in a local database and a common cross-reference library which is stored in a remote database. A means is provided for updating the common and local cross-reference libraries. Additionally, means might also be provided for court reporter training and interactive updating of the cross-reference libraries.

Objects are also achieved in an alternate transcription system which comprises a cross-reference library and a case database which contains words relating to a specific lawsuit at issue. A means is provided for automatically comparing the cross-reference library with the case database, and for updating the cross-reference library.

Other objects and further aspects of the present invention will become apparent in view of the following detailed description and claims with reference to the accompanying drawings.

BRIEF DESCRIPTION OF THE DRAWINGS

FIG. 8 is an exemplary diagram of a foreign language table which is used to cross-reference text of a first language that corresponds to translated words of a first language.

DESCRIPTION OF THE PREFERRED EMBODIMENT

Figure 1:
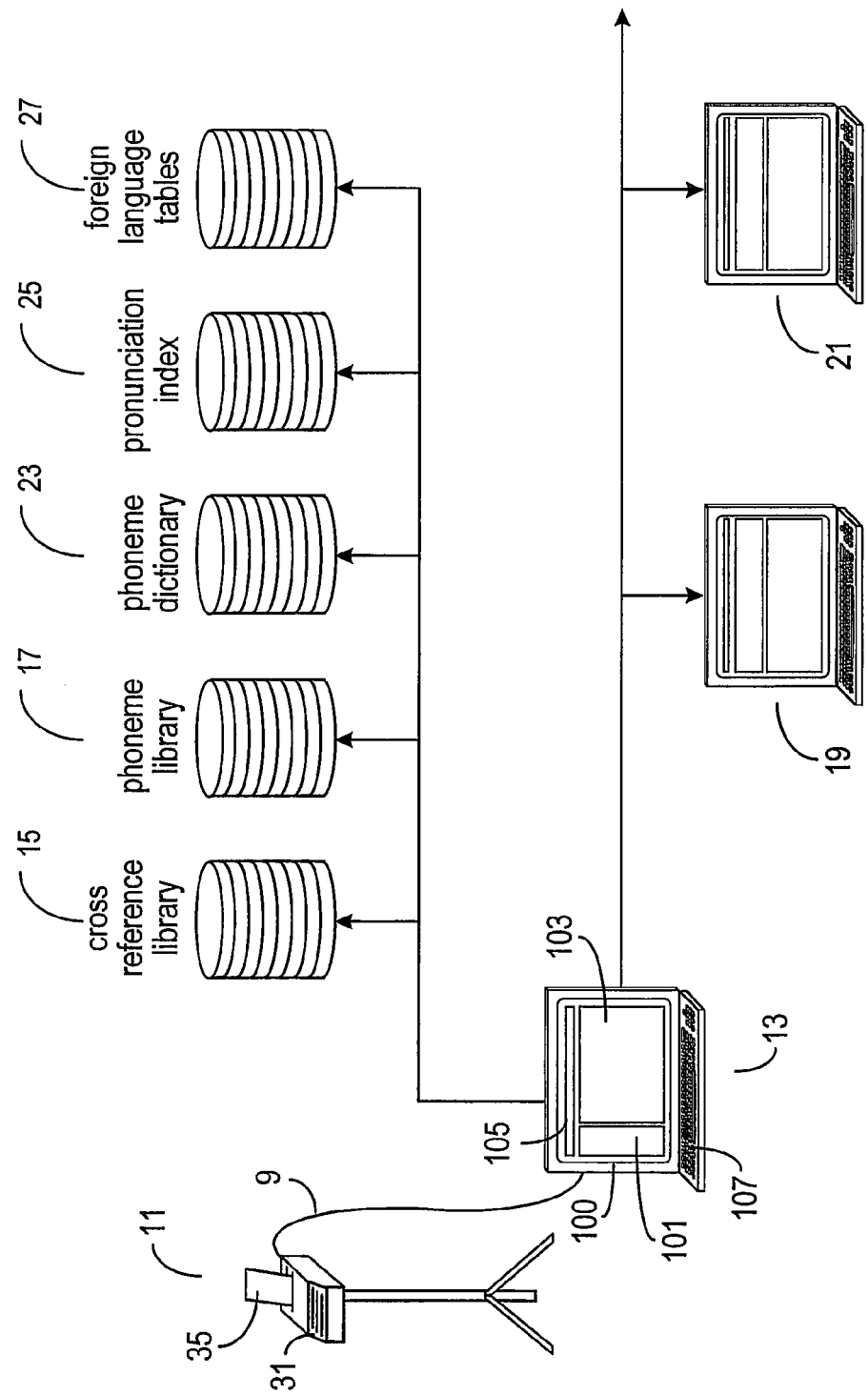
FIG. 1 is a perspective view the transcription system of the present invention illustrating the interaction of a CAT system configured to proved real-time, down-line transcription.

FIG. 1 provides an overview of the interaction of a CAT system 13 according to the present invention for providing real-time, down-line transcription. In one embodiment of the present invention, at a trial or deposition a stenographic recorder 11 records digital codes representing the key-stroke entered by a court reporter via a keyboard 31. The recorded key-strokes are intended to correspond to the words spoken at a deposition or trial. The stenographic recorder 11 communicates these key-strokes codes to a CAT system 13 via a link 9. Upon receipt, the CAT system 13 attempts to transcribe the key-stroke codes into the exact text of the words which were spoken to provide for a real-time textual display of the transcript.

To accomplish transcription, the CAT system 13 primarily uses a cross-reference library 15 to locate the exact text counterpart of the spoken words. However, whenever the cross-reference library 15 fails to provide an exact text counterpart, the CAT system 13 resorts to using a phoneme library 17 to provide readable substitute text (referred to hereinafter as "phoneme text") as the next best option to the exact text replacement. Although this phoneme text does not provide exact transcription, it does provide pronounceable text which can be easily understood by the reader.

The CAT system 13 transmits both the exact and, where necessary, phoneme text down-line to attorney terminals 19 and 21 via a communication link 23 for real time review. Further detail regarding the down-line terminals such as terminals 19 and 21 can be found in the pending parent U.S. application Ser. No. 08/036,488, filed Mar. 24, 1993, by Bennett et al. which is incorporated herein by reference.

FIG. 1 also illustrates the use of a phoneme dictionary 23 which is used in an alternate embodiment of the present invention. When exact text cannot be located in the cross-reference library 15, the CAT system 13 first identifies the phoneme text in the phoneme library 17 as described above. However, instead of immediately sending the identified phoneme text down-line for viewing, the CAT system 13 makes a second attempt at accessing the exact transcription text via the phoneme dictionary 23. The phoneme dictionary 23 has the same structure and searching strategy as the cross-reference library 15. The only difference being instead of indexing using a series of key-stroke codes, the phoneme dictionary indexes using the phoneme strings. Only after a failed second attempt of locating an exact replacement will the CAT system 13 communicate the phoneme text down-line.

If when forced to resort to the phoneme library 17, no phoneme text counterpart to a key-stroke can be found, the CAT system 13 accesses a pronunciation index 25 which will substitute a dictionary-like pronunciation for the key-stroke codes prior to communication down-line. This provides a readable pronunciation to the viewer which is second only to the phoneme text.

Additionally, where the transcription involves participants of more than one language, the CAT system 13 utilizes foreign language tables 27 to provide readable real-time transcription for all of the down-line participants such as those located at the terminals 19 and 21.

More specifically, in response to the court reporter stroking a keyboard 31, the recorder 11 creates a key-stroke code and transmits this to the CAT system 13 (the reporter's terminal) along the communication link 9. The CAT system 13 displays the key-stroke codes received in two different formats on a screen 100 of the CAT system 13. The CAT system 13 provides a tape window 101 which is shaped and sized much like a paper tape, such as a paper tape 35 of the recorder 11. The tape window 101 displays alphabetic representations for received key-stroke codes in a line by line fashion wherein each key-stroke code is represented on a single line. The tape window 101 thus provides an electronic version of a paper tape which is generally in the format familiar to court reporters.

The screen 100 also includes a transcription window 103 which displays the alphabetic and numeric text representative of the spoken words, i.e., displays the transcribed version of key-stroke codes received from the recorder 11. Through user selection, the windows 101 and 103 can be configured to update the screen 100 upon complete transcription of each: 1) word; 2) sentence; 3) Q & A; or 4) Q or A. The display can also be chosen to operate in either scrolling or paging fashion. For example, with a preferred display selection, the transcription window 103 will only display the current Q & A as it is developed on a sentence by sentence basis. After completing the transcription of the first sentence of a new question, the CAT system 13 clears the currently displayed Q & A (the old Q & A) from the window 103, and displays the transcribed alphabetic and numeric text of the first sentence of the new question. As each additional sentence of the new Q & A is received and transcribed, it too is added to the window 103. After fully transcribing the new Q & A, window 103 holds the display of that new Q & A until the end of the first sentence of the next Q & A; upon which, this cycle repeats.

To set up the mode of updating the windows or to access any of a variety of other CAT system commands, the screen 100 also includes a command line 105. In one embodiment, the command line 105 lists several one-word commands displayed horizontally in a single line of text. The commands listed by the command line 105 can be selected directly using a mouse, pen, fingertip or other input device (none of which are shown) or indirectly by simultaneous pressing the "alt" key and the first letter of the desired command on the keyboard 107. Any other mode or method of command selection involving, for example, button bars, pull-down menuing, or icons might also be used.

As previously stated, a court reporter strokes the stenographic recorder 11 in response to the spoken word. Generally, a given word may demand either a single stroke or multiple strokes based on the complexity of its phonetic composition. Upon completing the strokes necessary for a given word, the court reporter immediately begins stroking the next word. No space bar or other word separator is stroked between words. As a result, all of the strokes run together. However, the court reporter does stroke to indicate an end of a sentence. Therefore, the CAT system 13 operates on keystrokes in sentence units (the basic unit of transcription) so that the beginning and end of each word can be most easily located. In addition, some court reporters use key-strokes to indicate punctuation. When used, the CAT system 13 can decrease the size of the basic unit of transcription by grouping only those words between punctuation. This may result in an easier identification of words and possibly provides a higher percentage of transcription.

Providing the foundation of the transcription process, the CAT system uses the cross-reference library 15 which lists the exact text of each word that the court reporter has transcribed to date using that library. Each of these words are associated with the corresponding stenographic key-stroke or sequence of key-strokes that represents that word. Although the contents of the cross-reference library 15 can be displayed in a visual manner, it is stored in a binary tree structure for efficient searching.

Upon receiving the first key-stroke code of the sentence, the CAT system 13 begins transcription. This first code is compared to all of the possible first stroke codes within the court reporter's cross-reference library. If a complete cross-referenced word is found, the CAT system 13 preliminarily treats the first key-stroke code as a complete word. Upon receiving the second key-stroke code in the sentence, the CAT system 13 again treats this second key-stroke code as the beginning of another word and looks again to all of the possible first stroke codes within the library. If a complete cross-referenced word is identified, the CAT system 13 similarly treats the second key-stroke code as a second complete word, and the process repeats. If at any point a cross-referenced word cannot be found for a single key-stroke code, subsequent and previous codes are utilized to branch to words requiring multiple key-strokes.

If no words can be identified from the single or multiple key-stroke codes, the CAT system 13 must back-track. Specifically, the CAT system 13 must back-track to the previous key-stroke code which was preliminarily classified as a complete transcribed word and treat it as if it is only a first part of a word. The CAT system 13 uses the subsequent key-stroke codes thereto to potentially verify or disprove this possibility by locating a multiple key-stroke word. If a multiple key-stroke word cannot be located, the CAT system 13 marks the code as being incapable of exact transcription and continues the rest of the sentence. If a multiple key-stroke word is located, the CAT system 13 continues this forward searching with backtracking strategy until the most complete transcription of the sentence unit can be found. Other strategies such as a backward searching approach are contemplated which might also be used.

Figure 2:
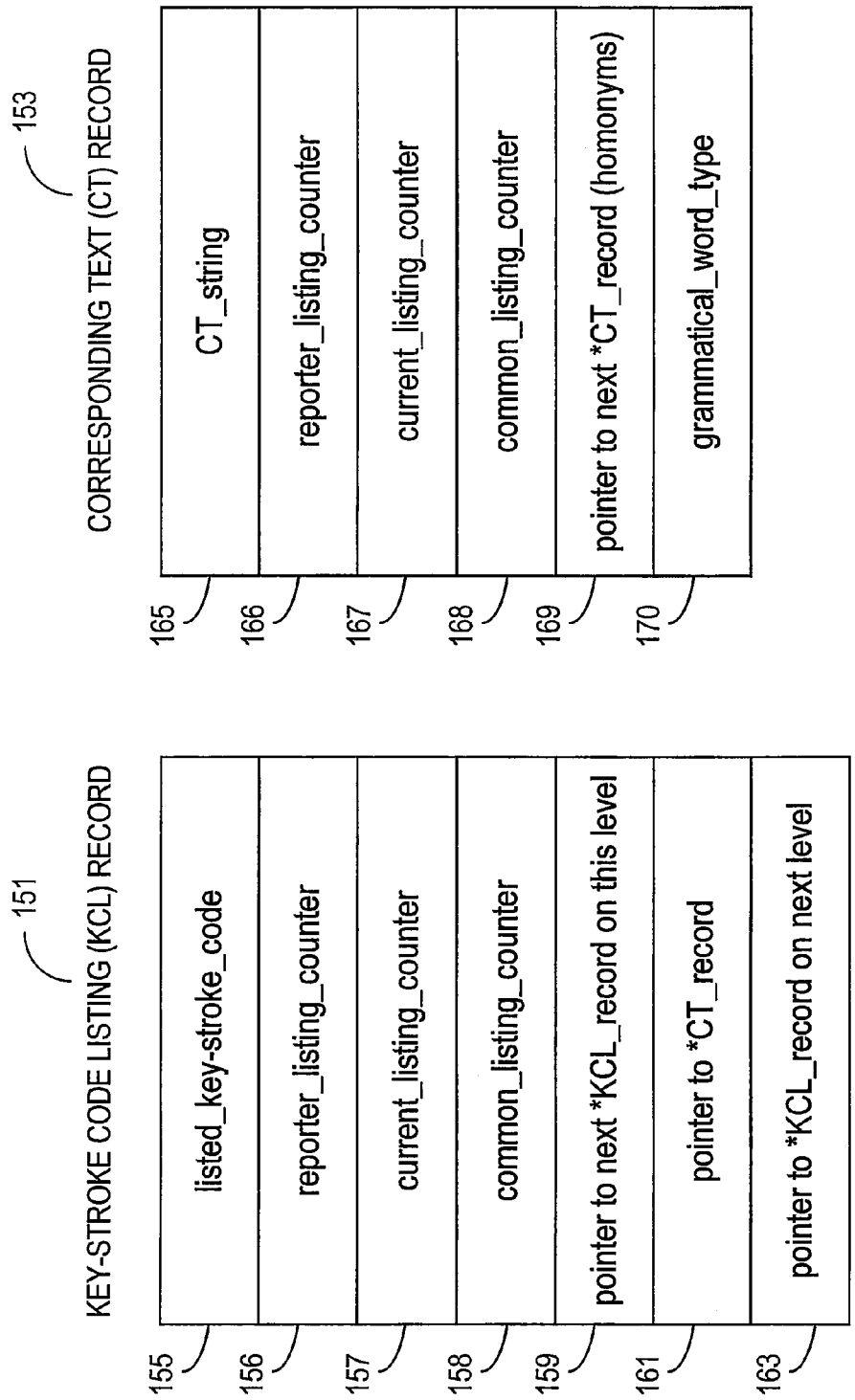
FIG. 2 is a diagram representing the association of data fields in records used as the fundamental building blocks in the data structure of the cross-reference library according to the present invention.

FIG. 2 is a diagram representing the association of data fields in a record which is used as a basis for the overall data structure of the cross-reference library 15 according to the present invention. In particular, the CAT system 13 utilizes a linked-list arrangement of two types of data records: a key-stroke code listing (KCL) record 151 and a corresponding text (CT) record 153. Although other types of records are contemplated, these two types of records provide the preferred storage structure for the court reporter's cross-referencing library.

Basically, the CAT system 13 uses records 151 and 153 to associate each individual key-stroke code with as many subsequent key-stroke codes as proves necessary to reconstruct the spoken word. Particularly, the KCL record 151 associates: 1) a listed key-stroke code (LKC) field 155 for storing a specific key-stroke code; 2) a reporter listing counter field 156 for storing a value indicative of the number of times that the CAT system 13 uses the record; 3) a current listing counter field 157 for storing a value indicative of the number of times that the CAT system 13 uses the record in the current case; 4) a common listing counter 158 for storing a value indicative of the number of times that any CAT system, including the CAT system 13, used the record; 5) a first KCL_record pointer field 159 for storing a pointer to the next KCL record on this level; 6) a CT record pointer field 161 for storing a pointer to an associated CT record; and 7) a second KCL_record pointer field 163 for storing a pointer to a corresponding KCL_record at the next listing level down.

Similarly, the CT record 153 associates: 1) a CT string field 165 for storing a string of text; 2) a reporter listing counter field 166 for storing a value indicative of the number of times that the CAT system 13 uses the current string; 3) a current listing counter field 167 for storing a value indicative of the number of times that the CAT system 13 uses the string in the current case; 4) a common listing counter 168 for storing a value indicative of the number of times that any CAT system, including the CAT system 13, used the current string; 5) a CT record homonym pointer field 169 for storing a pointer to another CT record containing a homonym to the contents of the CT string field 165; and 6) a grammatical word type field 170 for storing an indicator of the type(s) of word(s) the contents of the CT string field 165 happens to be (i.e., noun, verb, adverb, noun and verb, etc.).

Figure 3:
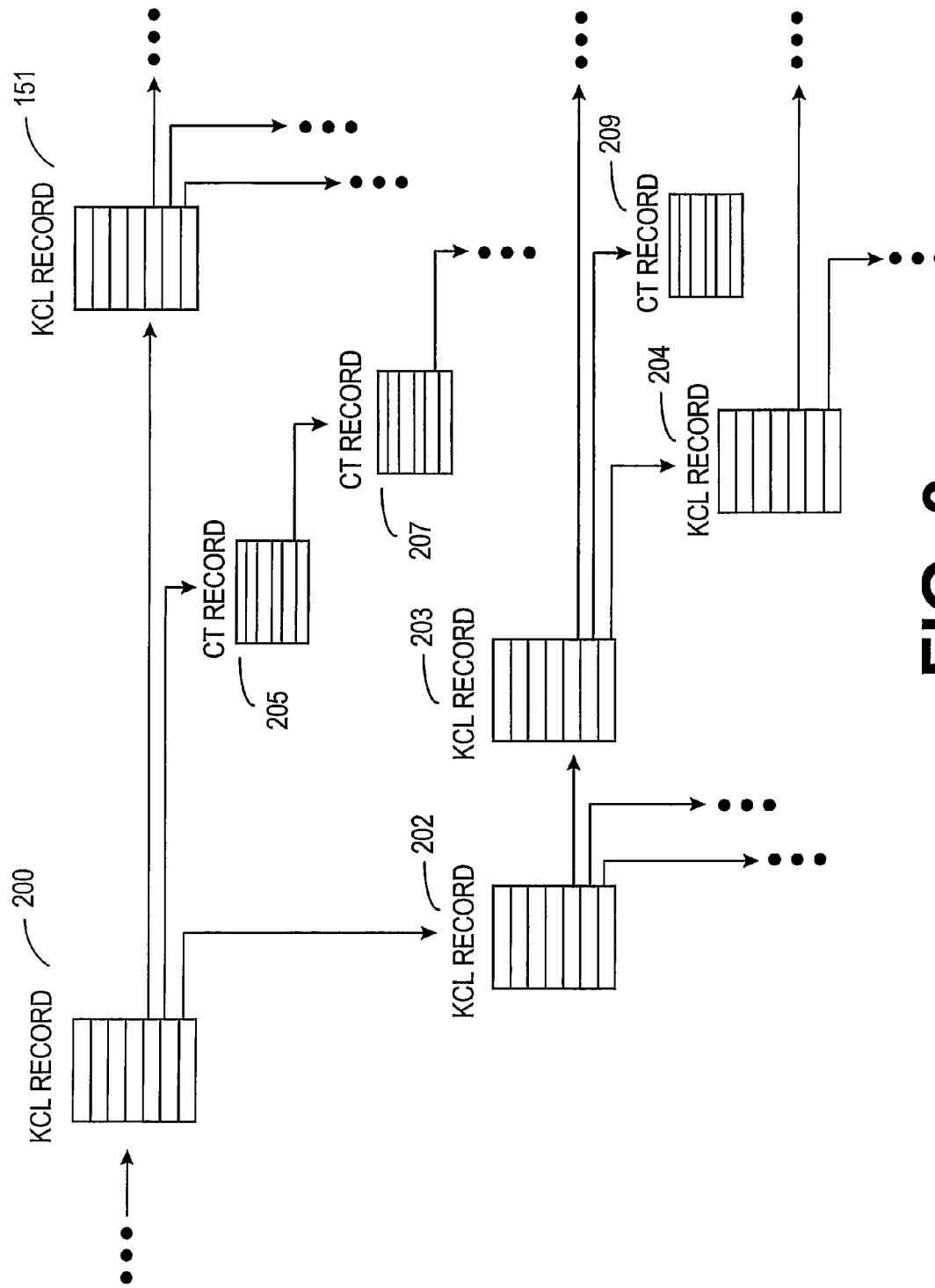
FIG. 3 is a detailed diagram representing the overall data structure used by the CAT system of the present invention.

FIG. 3 provides a detailed illustration representing the overall data structure of the cross-reference library used by the CAT system 13. KCL records 200, 201 and all KCL records (not shown) directly to the right and left of records 200, 201 constitute a first listing level. This first listing level is a linked-list of each beginning key-stroke code of the words held in the cross-reference library 15. The KCL records are "linked" using the first KCL record pointer field 159, i.e., each pointer field contains the address in memory where the next KCL record resides.

All words which can be represented by a single key-stroke can be located using a single KCL record at this first level. Words requiring multiple key-strokes must identify the first key-stroke of the word in one of the KCL records at the first listing level, and that identified KCL record should then point via field 163 to a second listing level. For example the KCL records 200 points to a second listing level comprised of KCL records 202, 203, etc. Similarly, a third listing level exists below the KCL record 203 beginning with a KCL record 204, and so on as necessary to reach multiple key-stroke words.

To directly identify exact text replacement using the cross-reference library, the CAT system 13 would first need to know the number of key-strokes required to represent every given word. Because this does not occur, the CAT system 13 must use a searching strategy to identify these numbers.

Because most words can be represented by a single key-stroke, the CAT system 13 initially treats all words as a single key-stroke word. Only after detecting transcription problems with subsequent key-strokes will the CAT system 13 back-track and consider whether the key-stroke might be the first of a multiple key-stroked word. In particular, using the identified KCL records constituting a second listing level, the CAT system 13 must locate a single KCL record containing the second key-stroke in the multiple key-stroke series. The identified KCL record at this second level will point to a subsequent level for providing a subsequent key-stroke in the multiple key-stroke series. This process continues until the last key-stroke is identified.

In addition, each of the KCL records at any listing level may or may not point via the field 161 to associated text. If a single word corresponds to a single key-stroke, the identified KCL record in the first listing level will point to a CT record which contains the text of that word. Similarly, a KCL record in the first listing level will point to a CT record which contains the text of that word. Similarly, a KCL record at the second level identified for a word represented by two key-strokes will point to a CT record containing the actual text of that word. In this way, any key-stroke or series of key-strokes which represent a word can be transcribed if the cross-reference library contains the path to the word formed by the key-stroke(s) of that word, i.e., if the cross-reference library contains the text counterpart.

More particularly, upon receiving the first key-stroke code from a sentence, the code is compared with each key-stroke code stored in each KCL record on the first listing level. For example, if the received code does not match the stored code in the listed key-stroke code field 155 of the KCL record 200, the CAT system 13 uses the contents of the field 159 of KCL record 200 to access the next KCL record, the record 201, for a similar comparison to the code stored therein. In this manner, by stepping through the first listing level, a matching KCL record can be found.

Assuming that the code stored in KCL record 200 does match the first key-stroke code received, the CAT system 13 accesses the associated CT record 205 if present to retrieve readable cross-referenced text. Additionally in this example, the CT record 205 provides the CAT system 13 with a pointer to a homonym stored in a CT record 207. The text located in CT records 205 and 207 possibly provide the desired transcription, but only by transcribing the entire sentence can the CAT system 13 be sure. Often times, the CAT system 13 discards such text in favor of multiple key-stroke text. Particularly, the CAT system 13 uses the KCL record 200 as a back-tracking point. If in transcribing the sentence, the KCL record 200 only proves to be the first of two key-strokes, the CAT system 13 uses the next level pointer 163 in the KCL record 200 to access a second listing level. This second listing level is specifically associated with the KCL record 200 and begins with KCL records 202 and 203 followed by all KCL type records (not shown) to the right of record 203. Any second code received which follows a first code which matches that stored in the KCL record 200 is compared to the codes stored in the KCL records on the second listing level. The KCL record 204 represents yet a third listing level under the key-stroke sequence stored in the record 200 and 203. CT records may or may not be associated with a given KCL record, depending on whether a corresponding word exists for the represented key-stroke code sequence. The KCL record 204 having no CT record associations exemplifies such a situation.

Only a single CT record is generally associated with a single KCL record, such as is shown with KCL record 203 and a CT record 209. Only when homonyms exist will there be multiple CT record association, as illustrated with the KCL record 200 and the CT records 205 and 207. Multiple CT record associations, however, are indirect in that each KCL record can only identify, i.e., point to, a single CT record. Additional CT record "homonyms" are pointed to by the identified CT record.

If homonyms are found, signifying multiple CT record association, two selectable modes are provided to display the homonyms. In an expanded mode, all homonyms are displayed within parenthesis so that selection of the appropriate homonym can be made upon review of the grammatical context. The ordering of the display of homonyms is based on the most to the least probable replacement. For example, the homonyms "their", "there" and "they're" would be displayed as (there.|their|they're). Alternatively, in the selection mode, only the most probable homonym is displayed with an asterisk (*there) indicating the homonym status. By selecting the word, the other homonyms can be selected as a replacement. In addition, to correct such common homonym transcription problems, another level of transcription is contemplated using so called "artificial intelligence" techniques for determining the correct word grammatically in the context of the given sentence.

Upon receiving a first key-stroke code of a sentence from stenographic recorder 11, the CAT system 13 begins a transcription expedition by parsing through a first listing level of the cross-reference library in an attempt to find a matching KCL record. If a matching KCL record is found which has an associated CT record transcription, the CAT system 13 records the match and treats the second (next) code received as the beginning of a new word by parsing the first listing level.

If a matching KCL record found for first code received has no associated CT record, the CAT system 13 treats the second key-stroke code received as the second part of the word by branching to the second listing level pointed to by the matching KCL record (on the first listing level). Note that if properly constructed, there should never be any KCL record which has neither a pointer in field 161 to an associated CT record nor a pointer in field 163 to a subsequent level of KCL records. If a match is found at the second listing level with an associated CT record transcription, the CAT system 13 treats the third key-stroke code received as the beginning of a new word by parsing the first listing level, and repeating the cycle.

If after transcribing a series of key-strokes in a sentence, the CAT system 13 encounters a dead end, i.e., an associated CT record can not be identified, back-tracking must occur. The CAT system 13 returns to the last matching KCL record of the previously transcribed word, and continues the transcription process through subsequent listing levels to see if what had been considered an entire word is really only a portion thereof. If a match is found with an associated CT record transcription, the CT record at that subsequent (deeper) listing level is stored, and the following key-stroke code received is treated as the beginning of a new word, repeating the cycle.

With each successive, unsuccessful parsing round, the previously described transcription process becomes more and more complex with potentially many parallel and nested transcription pathways being considered. If available, the first completely transcribed sentence found is communicated to attorney terminals 15 and 16. Otherwise, the sentence formulation with the greatest number of key-strokes transcribed will be prepared for communication.

Figure 4:
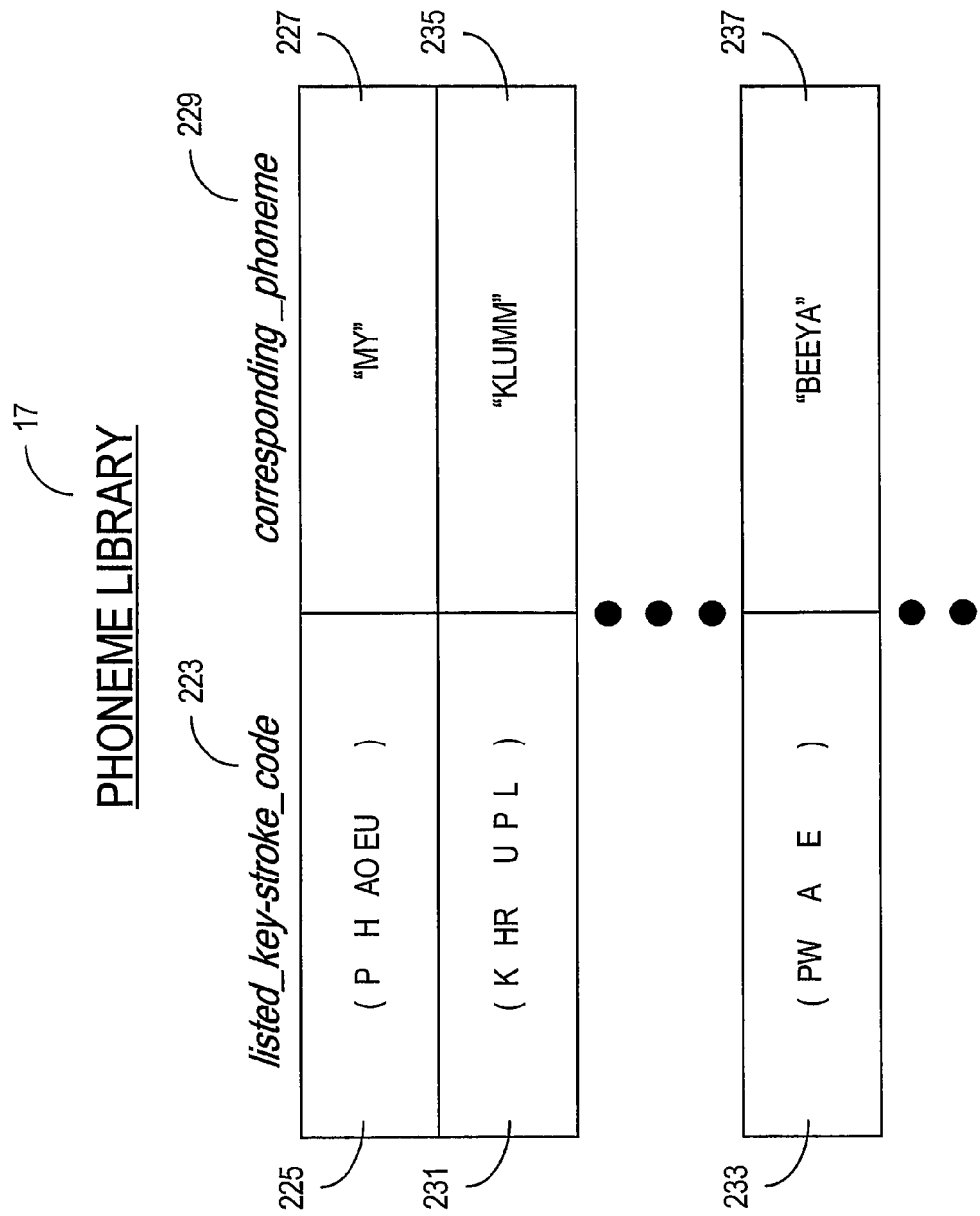
FIG. 4 is a diagram representing the phoneme library used in the present invention wherein substitutions of readable phoneme text can be found for untranscribed key-strokes to aid down-line viewing.

If a completely transcribed sentence is unavailable, a second phase of transcription, the phoneme transcription phase, is invoked. In this phase, as illustrated by the phoneme library representation in FIG. 4, each untranscribed key-stroke is cross referenced into a phoneme library 17 to obtain readable phoneme text. By pronouncing the phoneme text, the layperson (down-line viewer) will identify the actual word or words which the cross-reference library did not contain.

Specifically, the phoneme library 17 is a double entry list containing a list 223 of key-stroke codes and a corresponding list 229 of phonemes. The listed key-stroke codes 223 provides storage for key-stroke codes which have been directly associated with phoneme text stored in the corresponding phoneme list 229. The CAT system 13 parses through the series of listed key-stroke codes held in the listed_keystroke_code 223 to locate an untranscribed key-stroke code. If located, the CAT system 13 extracts the associated phoneme text stored in a field of the corresponding phoneme list 229. For example, if the CAT system 13 receives a key-stroke code representing the key-stroke "P H AO EU" for which no counterpart exists in the cross-reference library 15, the CAT system 13 parses the listed_key-stroke_code entries 223 and locates a specific entry in a field 225. The corresponding readable phoneme text entry "my" in a field 227 of the corresponding_phoneme list 229 is then extracted. Instead of transmitting the key-stroke "P H AO EU" down-line, the CAT system 13 substitutes the phoneme text "my" in the current sentence so that down-line pronunciation is simplified.

In a second example, if the court reporter responds to the word "Columbia" by pressing the key-stroke "K H R U PL" followed by the key-stroke "P W A E", the CAT system 13 first attempts to find exact transcriptions for the two key-strokes using the cross-reference library. If exact transcription text cannot be found, the CAT system 13 parses the phoneme library 17 and finds the phoneme text "KLUMM" and "BEEYA" for the first and second key-strokes, respectively. Because the CAT system 13 cannot be sure if the two key-strokes form a single word or two independent words, a tilde ("~") is placed between the two phoneme text strings for substitution and down-line display. Although only single phoneme text strings are shown, any of the corresponding phonemes in the list 229 may also contain multiple strings of phoneme text separated by a tilde ("~") where needed to provide better pronounceability.

Additionally, upon the court reporter substituting exact text of the word or words spoken for phoneme text that was used during a proceeding (an interactive process carried out by the court reporter after the deposition), the CAT system 13 automatically updates the cross-reference library by adding the key-stroke or key-stroke sequences and associated exact text.

Figure 5:
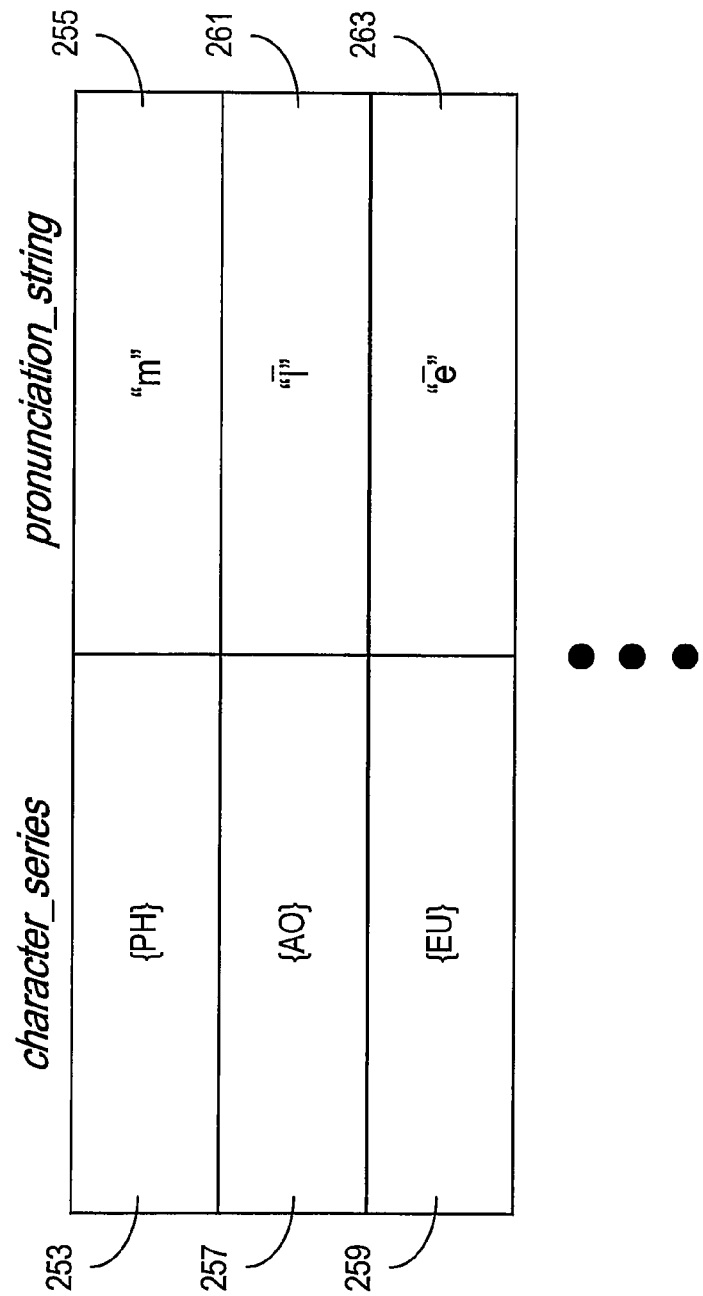
FIG. 5 is a diagram representing the production key index used in the present invention wherein substitutions of a series of pronunciation-strings can be found when phoneme text is unavailable.

If a key-stroke cannot be found by parsing the listed key-stroke code fields 223 of the phoneme library 220, the key-stroke undergoes an alternate form of pronounceable text substitution using the pronunciation index 25 as illustrated in FIG. 5. In particular, using the key-stroke "P H AO EU" as an example, if the cross-reference and phoneme libraries 15 and 17 yield no positive results, the characters of the key-stroke are cross-referenced into the pronunciation index 25 to identify pronunciation strings for each of the characters singly or in groups. The pronunciation index 25 is modelled from pronunciation keys using long or short vowel and consonant combinations found in any ordinary dictionary. The grouping of characters to be cross-referenced into the index 25 is governed by standard stenographic key-stroke characters and character combinations known to all court reporters. For example, every court reporter knows that a "PH" is equivalent to an "M"; the pronunciation index 25 indicates this. Once pronunciation strings are identified for all of the series of characters in the key-stroke, the strings are combined and substituted for the untranslated key-stroke code and communicated down-line for viewing.

More specifically, in the example illustrated, the CAT system 13 locates the "PH" sub-string in a character series field 253 and extracts the associated pronunciation string "m" from a field 255. Similarly, the CAT system 13 locates "AO" and "EU" in fields 257 and 259, and extracts the associated pronunciation strings "ī" and "ē" in fields 261 and 263, respectively. Together, these character substitutions form the overall string "mīē" which is substituted for the untranscribed key-stroke code for down-line viewing.

The overall pronounceable string generated by accessing the pronunciation index 25 can be used to generate a more complete phoneme library 17. For example, if the pronounceable string is "mīē", after the deposition the court reporter can choose a more easily pronounceable string such as "my" and place it in the phoneme library 17. Thereafter, if the same key-stroke is ever encountered again, the updated phoneme library 17 will provide text without having to resort to the pronunciation index 25. The CAT system 13 interactively controls this entire process, and also updates the cross-reference library accordingly.

Figure 6:
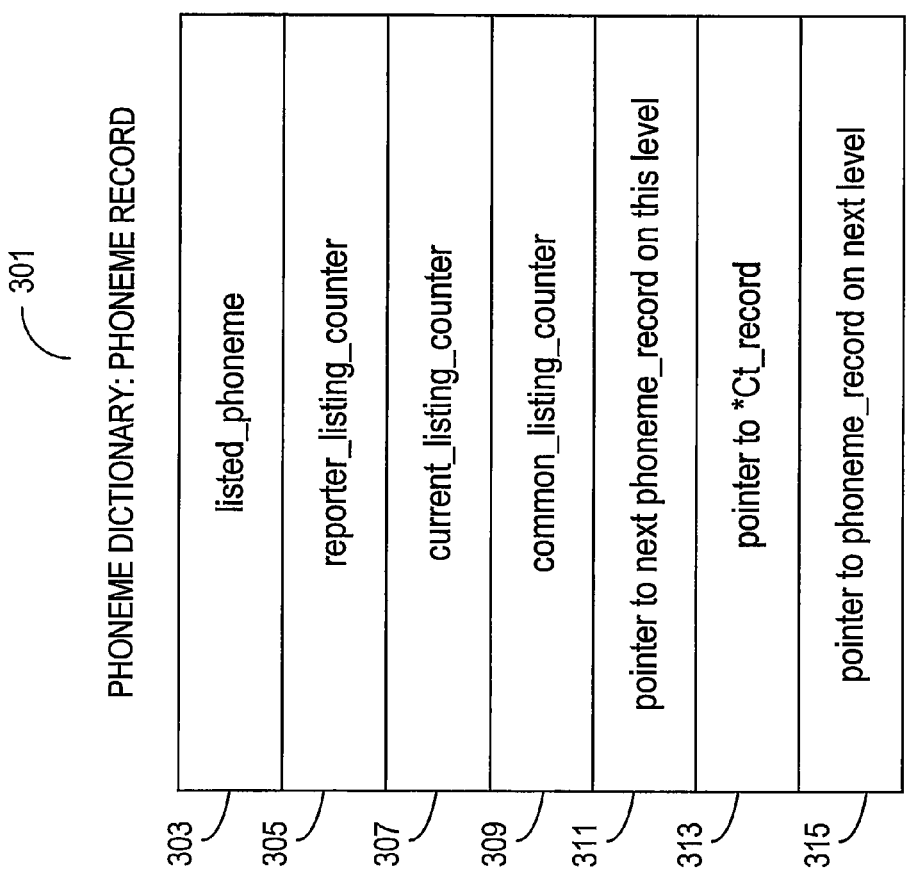
FIG. 6 is an illustration of the phoneme record used as a basic building block in the overall data structure of the phoneme library which is used to locate exact text substitution for identified phoneme text according to the present invention.

In another embodiment of the present invention illustrated in FIGS. 1 and 6, instead of directly substituting the phoneme text for down-line viewing, the CAT system 13 makes a second attempt at locating exact text using a phoneme dictionary 23. Using the same linked list structure and searching strategy as is detailed in relation to the cross-reference library 15, the CAT system 13 attempts to locate exact text. The only differences between the cross-reference library 15 and the phoneme dictionary 23 can be found in the replacement of the KCL type record 151 (FIG. 2) with a phoneme type record 301 (FIG. 6), and, instead of working with an entire sentence unit, the unit of transcription using the phoneme dictionary 23 would only be the particular sequence of key-strokes having no counterpart text in the cross-reference library 15.

Because the overall data structure, association with CT records, and searching strategy as illustrated by FIGS. 2 and 3 for the cross-reference library are identical to that found in the phoneme dictionary 23, those details regarding the phoneme dictionary 23 need not be revisited. To repeat the description of such structure and operation for the phoneme dictionary 23, the reader is directed to the previous discussions relating to FIGS. 2 and 3 above, keeping in mind the substitution of the phoneme record 301 of the phoneme dictionary 23 with the KCL record 151 of the cross-reference library 15.

Using the phoneme dictionary 23, the CAT system 13 can identify exact text replacements even in circumstances where there are two or more ways to correctly "stroke" a word even though some ways are not registered in the cross-reference library.

In many instances, a key-stroke code or code sequence which cannot be located in the cross-reference library 15 proves to be a result of a typing-error. To help correct for such errors, the pronunciation string produced using the pronunciation index 25 for a word having no exact text replacement in the cross-reference library 15 is compared by the CAT system 13 to all of the words stored in the cross-reference library 15 to find those that offer the most probable match with possible typing errors corrected. The CAT system 13 takes into account both extra key-strokes and misplaced key-strokes while accounting for the layout of the keyboard 31 of the stenographic recorder 11. By visually presenting all of the probable matches to the court reporter, the CAT system 13 provides for easy identification and selection of the mistyped word, and performs automatic word substitution. This process usually takes place interactively after the deposition.

In the preferred configuration, the CAT system 13 does not directly compare the words stored in the cross-reference library with the pronunciation strings produced using the pronunciation index 25. Instead, the CAT system 13 converts each stored word into a pronunciation string using the pronunciation index 25 so that a like-kind comparison can be made. All such conversion of all of the stored words in the cross-reference library 15 takes place prior to beginning the correction process.

As illustrated in FIGS. 2 and 6, counters are placed in each KCL, phoneme and CT record for several purposes. To provide for optimization of the overall structure involved, each time a specific record is used in a final transcription, the associated counters are incremented. At the end of a deposition, the court reporter can run optimizing routines which sort the records in each linked list based on the count contained in the counters. In this way, for example, optimization could ensure that the most common matching KCL records are encountered first, speeding up the parsing response time. Similarly, the most common homonyms and phoneme text will be used first. Additional benefits attributable to the counters will become more apparent in the descriptions that follow.

Figure 7:
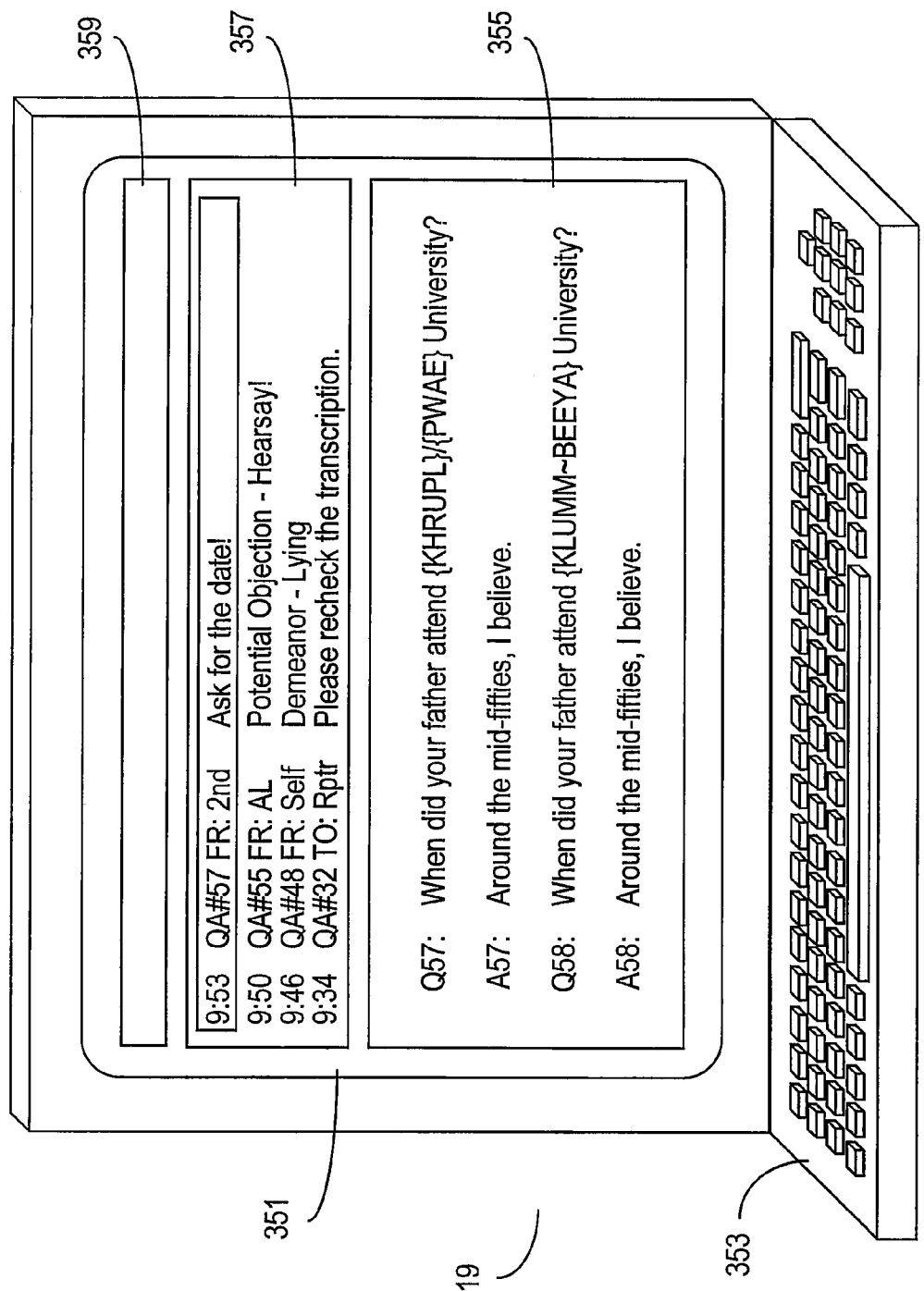
FIG. 7 is a perspective view of a down-line terminal of the present invention which illustrates the use of phoneme text replacement of untranscribed key-strokes.

FIG. 7 is a perspective view of the down-line terminal 19 of the present invention which more clearly illustrates the use of phoneme text replacement of untranscribed key-strokes. The down-line terminal 19 includes a screen 351 and a keyboard 353. The screen 351 is split into a transcription window 355 and a communication window 357, having a common command line 359. The window 355 displays the transcribed questions and answers received from the CAT System 13. As in the illustrative example, the communication window 357 contains a series of communications which relate to the questions and answers (Q & A's) displayed. More detail regarding the functionality of the communication window 357 and the terminal 350 can be found in the pending parent U.S. application Ser. No. 08/036,488, filed Mar. 24, 1993, by Bennett et al. which is incorporated herein by reference in its entirety.

The transcription window 355 illustrates the display of a fifty-seventh question (Q57) and fifty-eighth question (Q58) which provide a visual indication of the operation of the phoneme library 17. Both of these questions provide an exemplary transcription of a situation where the cross-reference library 15 did not contain exact text for the name "Columbia". Q57 exemplifies the down-line display without the use of the phoneme library 17 wherein the actual key-strokes "KHRUPL" and "PWAE" are placed into the sentence. It should become apparent to those who are not court reporters that these key-strokes cannot be easily understood. In contradistinction, Q58 provides the substitution "KLUMM" and "BEEYA" which when placed together provides most any reader with a readable and understandable pronunciation for the word "Columbia".

FIG. 8 is an exemplary diagram of a foreign language table which is used to cross-reference text of a first language that corresponds to translated words of a first language. Depositions involving participants in two or more languages are also contemplated by the present invention. In a first embodiment, the transcription process operates as previously described by providing a word for word transcription of the spoken question in a first language. Each of these words are then cross-referenced into a second language table to generate a sentence in a second language. Although the use of the second language table can be assigned to each attorney terminal down-line, in a preferred mode, the CAT system 13 performs the task. Once translated, the CAT system 13 transmits the second language sentence down-line to viewing participants who understand that second language. By using additional language tables, the CAT system 13 can provide translations for as many languages as is needed.

If the CAT system 13 performs the translation task, the CAT system 13 also manages the specific down-line routing of first and second language sentences, automatically. To accommodate automatic routing, all participants are required to identify their viewing language and their role in the deposition upon logging in to the system 13. The CAT system 13 stores the identified information in a log-in list. By referencing the log-in list, the CAT system 13 automatically configures itself so as to provide each participant with a translation in their appropriate language.

An exemplary second or foreign language table 27 is illustrated in FIG. 8. Using the language table 27, the CAT system 13 parses the text entries of a first language in a series of identified_CT_String fields 403 to locate the transcribed text of a word in a first language. Once located, the text of a second language is extracted from a corresponding_translation field 405 and placed into a second language sentence. Each transcribed word in the first language undergoes this process so that a second language sentence can be fully constructed. Thereafter, both the first and second language sentences are transmitted down-line to the appropriate participant. For example, the word "beach" located in a field 407 in a first language, English, would be directly substituted by the word "playa" of a second language, Spanish, contained in field 409. Although translations would not always be exact because of word context, the use of a human translator could be minimized. More importantly, the translation provides a check to see if the translator has summarized the translation.

As a supplement to the language table 401, word context analysis might also be implemented to increase the accuracy of the translations. Such analysis might run in parallel with the direct replacement offered by the language table 401 so that a quick and probably less complete translation would be initially displayed, while a slower and probably more complete translation using the grammatical contextual analysis would continue running in the background. Whenever the background translation finishes, the current displayed translation could be directly updated to display the more complete translation. It is contemplated that the background translation using the grammatical context sensitivity might run on an off-site computer, and not within the CAT system 13 if so desired. In such a configuration, the CAT system 13 would provide the quick translation without contextual analysis for display for a fast response time.

If the down-line participants that speak during the deposition all share a common language, the court reporter need only understand the common language and provide a cross-reference library and a phoneme library for that language. Alternate language translations for non-speaking, down-line participants, are provided using as many different foreign language tables as needed, as described above. Routing and language information is retrieved from the log-in list.

If, however, the down-line participants that speak during the deposition share two or more languages, in a preferred embodiment, a multi-lingual court reporter provides a cross-reference library and phoneme library for each of the languages being spoken. Moreover, multilingual court reporters may not be necessary so long as the court reporter has a cross-reference library for all languages being spoken. This is possible because the court reporter is merely creating key-strokes for sounds that they hear. Specifically, all court reporters might be able to select standard foreign language cross-reference libraries from a common remote database as described below in relation to FIG. 10.

Additionally, for each spoken language, language tables providing translation into each of the multiple languages are also necessary. During the translation process, when the multi-lingual court reporter indicates the beginning of a question or answer, or otherwise identifies the speaker, the CAT system 13 automatically selects the appropriate cross-reference and phoneme libraries to transcribe the spoken language, then accesses the appropriate foreign language tables to construct sentence translations. The resulting translations are automatically routed down-line. The CAT system 13 performs the automatic selection of libraries and tables and routing with reference to the entries in the log-in list.

Although the use of multiple phoneme libraries is preferred in a multiple language deposition, they may be completely ignored. Otherwise, when attempting to translate phoneme text into a second language, the phoneme text should be replaced by equivalent phoneme text in the second language. Therefore, pronunciation of the spoken word would sound the same in either language. Because with phoneme text the actual transcription of a word is unknown, a second language translation cannot be found. Therefore, as a substitute, a pronunciation for each of the participants in the phonemes of their language which sounds like the spoken word in the first language is provided. The pronunciation key index 25 could be similarly adapted.

Figure 9:
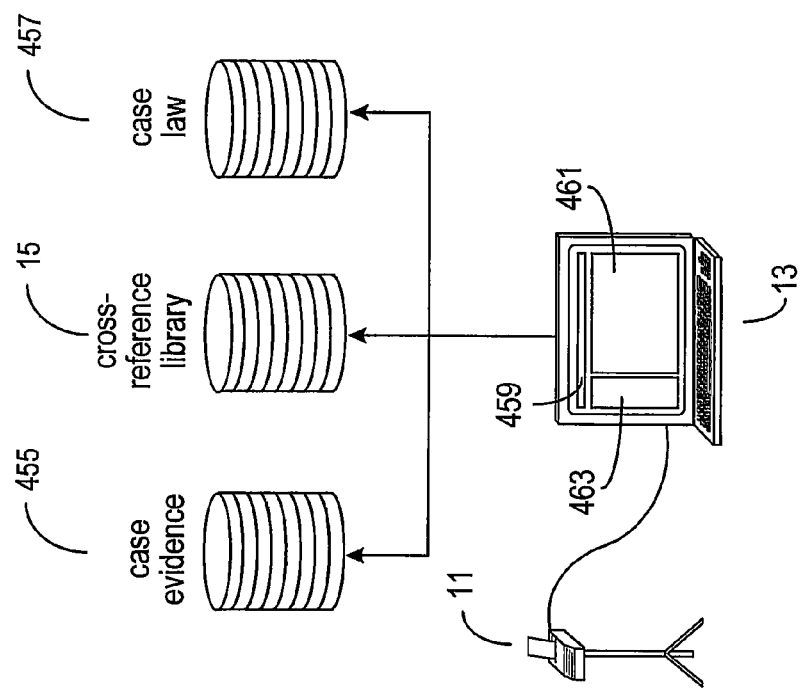
FIG. 9 is a detailed perspective view of the CAT system of the present invention which utilizes case evidence text, case law words and court reporter training sessions to prepare for an upcoming trial or deposition.

Unlike the previous features relating to increased transcription percentages and readability in real time, FIG. 9 illustrates features of the present invention for better preparing both the court reporter and the CAT system 13 for depositions or trials. At some time prior to an upcoming deposition or trial, the court reporter using the CAT system 13 updates the cross-reference library 15, and improves their stroking skills using the updated information.

Initially, the CAT system 13 compares the words in the cross-reference library 15 with the words stored in both a case evidence database 455 and a case law database 457. The CAT system 13 places the words which do not exist in the cross-reference library 15 into two new word lists which correspond to new case evidence words and new case law words. The CAT system 13 then presents these words to the court reporter for stroking practice and addition to the cross-reference library 15.

In particular, access to the case evidence database 455 would be provided by an attorney involved in the upcoming deposition or trial. Such access could either occur remotely or locally, depending on the location and accessibility of the attorney's case evidence database 455. For security purposes, the attorney may choose to provide the court reporter with access only to the list of words contained in the case evidence database 455. A simple parsing routine could easily collect such a list.

Instead of generating an entire list of all of the words contained in the case law database 457, the manager of the case law database 457 might instead generate lists of legal terms grouped by category of law and make them available to the CAT system 13. The court reporter then asks the attorneys for the areas of law that are involved, and interactively uses the CAT system 13 to select the appropriate lists of legal words. In the alternative, the CAT system 13 might parse the complaint and answer stored in the case evidence database 457, and, by comparing the names of the categories of law, could automatically select the appropriate word lists.

Once selected, the CAT system 13 automatically compares the case law and case evidence word lists to the words stored in the cross-reference library 15. The CAT system 13 discards the words from the lists which can be found in the cross-reference library, and provides an interactive training and updating session for the court reporter to add the remaining words to the cross-reference library 15. In particular, the CAT system 13 provides an interactive display consisting of a control line 459, an interaction window 461 for managing the list of new words, and a key-stroke practice window 463. The CAT system sequentially displays each remaining word from the new word lists in an interactive fashion in the window 461, prompting the court reporter to provide key-strokes via the stenographic recorder 11. The CAT system 13 displays each key-stroke entered in the window 463. The court reporter can practice stroking the word, and add the preferred key-strokes and the new word automatically to the cross-reference library 15. Upon completing the new lists, the CAT system 13 has prepared the court reporter and the cross-reference library 15 for the upcoming deposition or trial.

Figure 10:
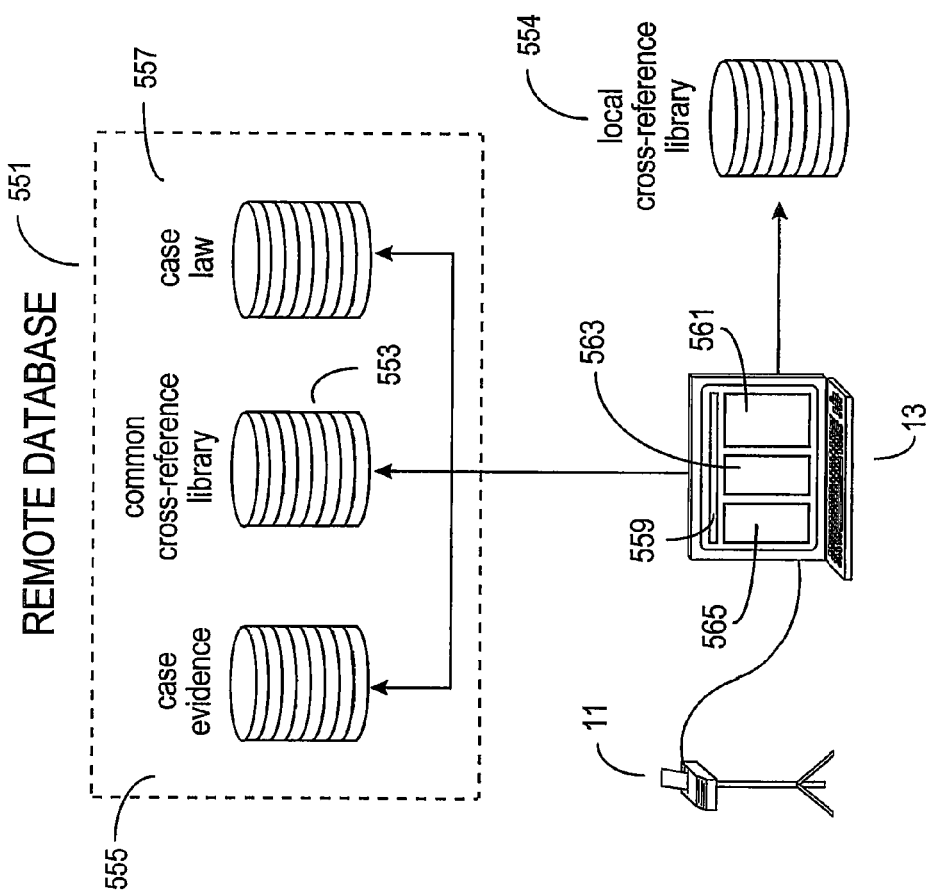
FIG. 10 is a detailed perspective view of the CAT systems of the present invention which utilizes a common cross-reference library to help to create a standard cross reference library used by each court reporter which will result in higher transcription percentages.

Referring to FIG. 10, an alternate embodiment of the training and updating features of the present invention provides training and updating functionality. During a deposition or trial, the CAT system 13 utilizes a locally stored cross-reference library 554 as described in detail with regards to FIG. 1 above. Prior to the deposition or trial however, the court reporter using the CAT system 13 logs-in to a remote database 551 to undergo training and to update the cross-reference library 554. A list of new words from the case evidence database 555 and case law database 557 are generated in a similar manner as described in relation to the embodiment illustrated in FIG. 9, by comparison to the contents of the local cross-reference library 554. The generated lists are then compared to the contents of common cross-reference library 553 and those of the new words that can be located in the common cross-reference library 553 are marked.

As described previously in reference to FIG. 9, the CAT system 13 sequentially displays the new words an interaction window 561. Similarly, the court reporter may practice key-stroking in a key-stroke practice window 563, and control the CAT system 13 via a command line 559. Additionally, however, a new window, a suggested key-stroke window 565 has been added to display the key-strokes stored in the common cross-reference library 553 for any new word which is contained in the common library 553 but not in the local library 554. The window 561 prompts the court reporter to adopt the key-strokes found in the common library 553. The court reporter may practice the suggested key-stroke in the window 563 and either adopt the suggest key-strokes or choose their own, and the local cross-reference library 554 is updated. If the court reporter chooses their own key-strokes, ignoring these suggested, the common cross-reference library 553 is also updated to add an alternate key-stroke pathway to the new word. Therefore, it can be appreciated that multiple key-strokes or sequences of key-strokes may define a path to the same word in the common-reference library 553. If multiple key-stroke pathways exist prior to the court reporters updating and training session for a new word found in the local cross-reference library 554, the CAT system 13 will present all of the key-stroke possibilities in the window 565 so that the court reporter might practice all before choosing one of the possibilities. In the alternative, the court reporter might add all of the key-strokes possibilities for a new word to the local library if training time is available.

If the new words do not exist in either the common or local cross-reference libraries 553 and 554, the court reporter is free to create, practice, and adopt any key-strokes that they may come up with. Adoption of such key-strokes automatically updates the common and local libraries 553 and 554.

Other court reporters using the CAT system 13 of the present invention would similarly log-in to the remote database 551 to both update their own local cross-reference libraries 554 and train. In this way, the cross-reference library 553 could be updated and maintained.

Also to maintain the common cross-reference library 553, each time a court reporter logs-in, the local cross-reference library 554 is compared to the common cross-reference library 553. Based on this comparison, the common cross-reference library 553 is updated to include new words and associated new key-stroke(s) or new key-stroke(s) used for old words from the local cross-reference library 554.

The counters illustrated in KCL and TC records of the local and common cross-reference libraries are also updated upon each log-in session. Referring back to FIG. 2, the current listing counters of the local cross-reference library 554 (FIG. 10) 157 and 167 are added to the common listing counters 158 and 168 in the counterpart records of the common cross-reference library 553 (FIG. 10). The local current listing counters 157 and 167 are then reset. In this way, the common cross-reference library 553 can track both the word usage and the most often used key-strokes representing a given word. During training sessions, the most common key-stroke(s) to a given word can be suggested first, followed by less popular key-stroke(s). Such suggestions urge the court reporters toward a common stroking standard.

In addition, a court reporter using the CAT system 13 may request a standardization session in which the common and local libraries 553 and 554 are compared so that the court reporter can do the common key-strokes to words as indicated by the counters in the common library 553. This process is carried out interactively with training using the windows 561, 563 and 565 as 1s previously described.

Additionally, new court reporters might adopt the entire common cross-reference library 553 or a commonly used portion thereof as their local cross-reference library 554. Similarly, seasoned court reporters after the log-in process would include their own local cross-reference library 554 or portion thereof as their local cross-reference library 553. Afterwards, the CAT system 13 provides interactive training for the new words which are identified by looking for a zero count in any of the reporter listing counters 151 and 153. In other words, if a court reporter has stroked a word at least once before, the KCL and TC records used would all have at least a count of one in the reporter listing counters having identified the new words in the newly adopted local cross-reference library 554, the CAT system 13 provides for training based on the new words constructed from the common listing counters 158 and 168, wherein the most common words are presented first. Over multiple training sessions, the court reporter can implement a full local cross-reference library 554 with associated training to provide a higher percentage of automatic transcription.

During depositions or trials, some exact transcription will not be possible due to stroking errors or new word encounters. The CAT system 13 also provides the three window display described above to correct the transcript. More important than correcting the current transcript, the court reporter must train and update the local cross-reference library 554 (if necessary) to prevent reoccurrences. Specifically, the window 561 is used to display the current transcript which includes each untranscribed word. The window 565 displays the key-stroke or key stroke sequence used for the untranscribed word. The court reporter identifies the correct word viewing these two displays and corrects the transcript using the CAT system 13. Upon correcting the transcript, the corrected text entered is immediately searched against the common and/or local cross-reference 553 and 554. If the word turns out to be new, the court reporter is given an opportunity to practice the key-stroking and adopt a key-stroke or set of key-strokes which they feel best represents the new word. This training and selection occurs in the window 565 using the stenographic recorder 11. Upon selection of the key-strokes, the common and local databases are updated with the new word. If instead the word which fails to be automatically transmitted turns out to be an old word which was mis-stroked, the window 565 merely provides the court reporter with an opportunity to practice the correct key-stroking which is automatically displayed in the window 563.

Although not shown, the remote database 551 may also store a common phoneme library, common phoneme dictionary, common foreign language tables and common pronunciation index. Each of these database local counterparts could be updated and maintained in a similar manner as with the common and local cross-reference libraries 553 and 554.

Furthermore, it is contemplated the use of the phoneme library 17 and phoneme dictionary 23 might not be used so that the pronunciation index 25 would be the only pronounceable text substitution used by the CAT system 13. Similarly, the pronunciation index 25 might not be used.

Although a stenographic recorder 11 is illustrated for use with the present invention, other recording techniques are also contemplated. For example, voice transcription might be implemented. Similarly, a pen-based note-pad computer having Optical Character Recognition (OCR) software which recognized shorthand might also be used. In either of these examples, a counterpart cross-reference library would exist as well as the phoneme library for phoneme text replacement, etc.

Additionally, the data structures and flow described above is merely one embodiment of the many possible ways of carrying out the specific objects of the present invention. Moreover, it is evident that the embodiments of the present invention described hereinabove are merely illustrative and that other modifications and adaptations may be made without departing from the scope of the appended claims.

We claim:

1. A method for translating between different languages during testimonial proceedings, comprising:
   receiving from a transcription system, in real-time, one or more stenographically coded representations of words spoken in a first language during a testimonial proceeding, without requiring confirmation of the stenographically coded representations;
   converting, in real-time, the stenographically coded representations to text in the first language;
   translating, in real-time, the text in the first language to text in a second language; and
   transmitting the text in the second language to a terminal for real-time display.

2. The method of claim 1, wherein converting the stenographically coded representations to the text in the first language in real-time includes replacing one or more of the stenographically coded representations with phoneme text in the first language and transcribing one or more of the stenographically coded representations to textual words in the first language.

3. The method of claim 2, further comprising displaying, in real-time, one or more of the phoneme text or the textual words on the terminal.

4. The method of claim 2, wherein replacing the stenographically coded representations with the phoneme text in the first language includes identifying the phoneme text in the first language in a phoneme library.

5. A system for transcribing testimonial proceedings, comprising:
   a transcription system in operative communication with a stenographic recorder, wherein the transcription system is configured to:
      receive, in real-time, one or more stenographic key-stroke codes from the stenographic recorder, wherein the one or more stenographic key-stroke codes represent words spoken during a testimonial proceeding;
      transcribe the one or more stenographic key-stroke codes into exact text that represents the words spoken during the testimonial proceeding; and
      replace the one or more stenographic key-stroke codes with phoneme text that represents the words spoken during the testimonial proceeding in response to failing to transcribe the stenographic key-stroke codes into the exact text; and a display device in operative communication with the transcription system, wherein the display device displays one or more of the exact text or the phoneme text that represents the words spoken during the testimonial proceeding.

6. The system of claim 5, wherein the transcription system transcribes the stenographic key-stroke codes into the exact text using a cross-reference library that associates a plurality of stenographic key-stroke codes with exact text that represents a plurality of words.

7. The system of claim 5, wherein the transcription system replaces the stenographic key-stroke codes with the phoneme text using a phoneme library that associates a plurality of stenographic key-stroke codes with phoneme text that represents a plurality of pronounceable strings.

8. The system of claim 5, wherein the exact text represents the words in a first language, and wherein the transcription system is further configured to:
  translate the exact text representing the words in the first language to text in a second language; and
  transmit the text in the second language to a second display device for real-time display.

9. A system for transcribing testimonial proceedings, comprising:
  an input device that generates one or more coded representations of words spoken during a testimonial proceeding in real-time;
  a transcription system in operative communication with the input device, wherein the transcription system is configured to:
    receive the one or more coded representations of the words spoken during the testimonial proceeding from the input device;
    transcribe the coded representations into exact alphabetic and numeric text that represents the words spoken during the testimonial proceeding; and
    replace the coded representations with phoneme text that includes one or more pronounceable substitute strings sounding substantially similar to the words spoken during the testimonial proceeding in response to failing to transcribe the coded representations into the exact alphabetic and numeric text; and
  one or more display devices in operative communication with the transcription system, wherein the one or more display devices display one or more of the exact alphabetic and numeric text that represents the words spoken during the testimonial proceeding or the phoneme text sounding substantially similar to the words spoken during the testimonial proceeding.

10. The system of claim 9, wherein the transcription system replaces the coded representations with the phoneme text using a phoneme library that associates a plurality of coded representations with phoneme text that represents a plurality of pronounceable substitute strings.

11. The system of claim 10, wherein the transcription system further replaces the coded representations with the phoneme text using a pronunciation index that associates a plurality of character groups with the plurality of pronounceable substitute strings.

12. The reporting system of claim 9, the transcription system further configured to receive, from a terminal in operative communication with the transcription system, an identification of one of a plurality of languages, wherein the exact alphabetic and numeric text represents the words in the identified language.

13. The system of claim 12, wherein the pronounceable substitute strings sound substantially similar to the words in the identified language.

14. The system of claim 13, the transcription system further configured to receive, from the terminal, an identification of one of a plurality of speakers speaking the words during the testimonial proceeding, wherein the identified speaker speaks in the identified language.

* * * * *